(12) United States Patent
Matsushima et al.

(10) Patent No.: US 10,778,857 B2
(45) Date of Patent: Sep. 15, 2020

(54) IMAGE FORMING APPARATUS

(71) Applicant: Brother Kogyo Kabushiki Kaisha, Nagoya-shi, Aichi-ken (JP)

(72) Inventors: Ryoichi Matsushima, Nagoya (JP); Hirofumi Kondo, Tajimi (JP); Yasuhiro Kato, Nagoya (JP); Masayoshi Hayashi, Nagoya (JP); Masato Sueyasu, Nagoya (JP); Reiko Toyama, Iwakura (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/862,395

(22) Filed: Jan. 4, 2018

(65) Prior Publication Data

US 2018/0131826 A1  May 10, 2018

Related U.S. Application Data

(63) Continuation of application No. 15/349,049, filed on Nov. 11, 2016, now Pat. No. 9,900,453, which is a (Continued)

(30) Foreign Application Priority Data

Apr. 25, 2012 (JP) .................................. 2012-100080
Jun. 21, 2012 (JP) .................................. 2012-139682

(51) Int. Cl.
*H04N 1/00* (2006.01)
*G03G 15/00* (2006.01)

(52) U.S. Cl.
CPC ...... *H04N 1/00559* (2013.01); *G03G 15/5087* (2013.01); *H04N 1/00519* (2013.01); *H04N 2201/0055* (2013.01)

(58) Field of Classification Search
None
See application file for complete search history.

(56) References Cited

U.S. PATENT DOCUMENTS

| 5,765,093 A | 6/1998 | Funato |
| 6,975,882 B2 | 12/2005 | Goto |

(Continued)

FOREIGN PATENT DOCUMENTS

| CN | 201928324 U | 8/2011 |
| EP | 1182520 A2 | 2/2002 |

(Continued)

OTHER PUBLICATIONS

Aug. 6, 2018—(CN) The First Office Action—App 201610979544. 6, Eng Tran.

(Continued)

*Primary Examiner* — Kevin Ky
(74) *Attorney, Agent, or Firm* — Banner & Witcoff, Ltd.

(57) ABSTRACT

An image forming apparatus that utilizes a communication device is disclosed. A communication unit of a housing which corresponds to an antenna portion is provided at a position at which the communication unit can be seen without obstruction from the upper side. A communication device such as a smartphone can be brought close to or into contact with the communication unit readily. Accordingly, wireless communication between the antenna portion and the communication device can be established.

8 Claims, 17 Drawing Sheets

Related U.S. Application Data continuation of application No. 13/852,795, filed on Mar. 28, 2013, now Pat. No. 9,509,873.

(56) References Cited

U.S. PATENT DOCUMENTS

| | | | |
|---|---|---|---|
| 7,079,079 | B2 | 7/2006 | Jo et al. |
| 7,612,791 | B2 | 11/2009 | Sugimoto |
| 7,764,236 | B2 | 7/2010 | Hill et al. |
| 7,871,140 | B2 | 1/2011 | Ohama et al. |
| 8,064,902 | B2 | 11/2011 | Kunii |
| 8,140,036 | B2 | 3/2012 | Minami |
| 8,736,862 | B2 | 5/2014 | Katsuyama et al. |
| 9,089,064 | B2 | 7/2015 | Katsuyama et al. |
| 9,116,490 | B2 | 8/2015 | Nakamura |
| 9,130,862 | B2 | 9/2015 | Iwai et al. |
| 9,131,086 | B2 | 9/2015 | Yuzawa |
| 2003/0054859 | A1 | 3/2003 | Goto |
| 2005/0206667 | A1 | 9/2005 | Ohama et al. |
| 2007/0014620 | A1 | 1/2007 | Sugimoto |
| 2007/0019215 | A1 | 1/2007 | Yu |
| 2007/0041036 | A1 | 2/2007 | Nakayama |
| 2007/0223055 | A1 | 9/2007 | Moribe |
| 2008/0012771 | A1 | 1/2008 | Watanabe |
| 2008/0204801 | A1 | 8/2008 | Kunii |
| 2008/0291283 | A1 | 11/2008 | Achiwa et al. |
| 2009/0184817 | A1 | 7/2009 | Ishizuka |
| 2009/0195804 | A1 | 8/2009 | Kojima |
| 2009/0210931 | A1* | 8/2009 | Hashimoto ............ G06F 21/35 726/4 |
| 2009/0231600 | A1 | 9/2009 | Hashimoto |
| 2009/0323104 | A1* | 12/2009 | Kamisuwa ......... H04N 1/00307 358/1.15 |
| 2010/0190445 | A1 | 7/2010 | Minami |
| 2010/0277763 | A1 | 11/2010 | Aoyama et al. |
| 2011/0181903 | A1 | 7/2011 | Katsuyama et al. |
| 2012/0092714 | A1* | 4/2012 | Suzuki .................. G06F 3/1212 358/1.15 |
| 2012/0262749 | A1 | 10/2012 | Yamamoto |
| 2012/0322461 | A1 | 12/2012 | Ito et al. |
| 2012/0329392 | A1 | 12/2012 | Matoba et al. |
| 2013/0128305 | A1 | 5/2013 | Grabkowitz et al. |
| 2013/0141758 | A1 | 6/2013 | Yoneda et al. |
| 2013/0324056 | A1 | 12/2013 | Maguire |
| 2014/0132652 | A1 | 5/2014 | Nakamura |
| 2014/0233162 | A1 | 8/2014 | Katsuyama et al. |
| 2014/0253949 | A1 | 9/2014 | Tsujimoto |
| 2015/0029540 | A1 | 1/2015 | Jo et al. |

FOREIGN PATENT DOCUMENTS

| | | | |
|---|---|---|---|
| JP | H09-245985 | A | 9/1997 |
| JP | 2001-016026 | A | 1/2001 |
| JP | 2002-225390 | A | 8/2002 |
| JP | 2003-091409 | A | 3/2003 |
| JP | 2004-330595 | A | 11/2004 |
| JP | 2005-227712 | A | 8/2005 |
| JP | 2005-354300 | A | 12/2005 |
| JP | 2006-053477 | A | 2/2006 |
| JP | 2007-021767 | A | 2/2007 |
| JP | 2007-081509 | A | 3/2007 |
| JP | 2007-188416 | A | 7/2007 |
| JP | 2007-292968 | A | 11/2007 |
| JP | 2008-009293 | A | 1/2008 |
| JP | 2008-123476 | A | 5/2008 |
| JP | 2008-219199 | A | 9/2008 |
| JP | 2009-160936 | A | 7/2009 |
| JP | 2010-000616 | A | 1/2010 |
| JP | 2010-023526 | A | 2/2010 |
| JP | 2010-114784 | A | 5/2010 |
| JP | 2010-177938 | A | 8/2010 |
| JP | 2011-103572 | A | 5/2011 |
| JP | 2011-154075 | A | 8/2011 |
| JP | 2011-193393 | A | 9/2011 |
| JP | 2011-203371 | A | 10/2011 |
| JP | 2011-240531 | A | 12/2011 |
| JP | 2012-210801 | A | 11/2012 |
| JP | 2013-228540 | A | 11/2013 |

OTHER PUBLICATIONS

Aug. 31, 2018—U.S. Notice of Allowance—U.S. Appl. No. 15/704,192.
Dec. 3, 2014—U.S. Non-Final Office Action—U.S. Appl. No. 14/039,747.
Mar. 12, 2015—U.S. Application as filed—U.S. Appl. No. 14/645,530.
May 8, 2015—(EP) Extended Search Report—App 13161645.0.
Sep. 18, 2015—U.S. Non-Final Office Action—U.S. Appl. No. 14/824,199.
Sep. 30, 2015—(CN) The Second Office Action—App 201310146433.3, Eng Tran.
Dec. 3, 2015—(CN) Notification of First Office Action—App 201310450047.3, Eng Tran.
Jan. 6, 2016—(CN) The Third Office Action—App 201310146433.3, Eng Tran.
Feb. 2, 2016—(JP) Notice of Reasons for Rejection—App 2012-100080, Eng Tran.
Mar. 8, 2016—(JP) Office Action—App 2012-247461, Eng Tran.
Jun. 23, 2016—U.S. Non-Final Office Action—U.S. Appl. No. 14/645,530.
Jun. 21, 2016—(JP) Decision of Refusal—App 2012-247461.
Jul. 19, 2016—(JP) Notice of Reasons for Rejection—App 2012-100080.
Jan. 27, 2017—U.S. Non-Final Office Action—U.S. Appl. No. 15/163,358.
Feb. 3, 2017—U.S. Final Office Action—U.S. Appl. No. 14/645,530.
Jan. 27, 2017—(JP) Office Action—App 2014-049114, Eng Tran.
May 19, 2017—U.S. Notice of Allowance—U.S. Appl. No. 14/645,530.
Jul. 25, 2017—(JP) Decision of Rejection—App 2014-049114, Eng Tran.
Sep. 12, 2017—(JP) Notice of Reasons for Rejection—App 2016-245471, Partial Eng Tran.
Kyocera Mita Corporation, Kyocera Mita Japan Corporation (Aug. 29, 2011): Announcement of A4 Multifunction Printer "Ecosys FS-C2626MFP and LS-3640MFP". Retrieved from the internet <URL: http://www.kyoceradocumentsolutions.co.jp/ news/rls_2011/ rls_20110829.html>.
Kyocera Mita Corporation, Kyocera Mita Japan Corporation: Special Feature, Management and Security of Monochrome Printer LS-3640MFP.; Retrieved from the internet <URL: http://www.kyoceradocumentsolutions.co.jp/products/ecosys/eco03/ls_3640mfp/merit_6.html>.
Kyocera Mita Corporation, Kyocera Mita Japan Corporation (Aug. 2011):; Product Catalog for Multifunction Printer FS-C2626MFP and LS-3640MFP.; Retrieved from the internet <URL: http://www.kyoceradocumentsolutions.co.jp/suppo; rt/prod_inf/pdf_c_html/fs_c2626mfp_ls_3640mfp.html>.
Apr. 23, 2019—(EP) Extended Search Report—App 19155304.9.
Jan. 25, 2019—(JP) Notice of Reasons for Rejection—App 2018-072950, Eng Tran.
Feb. 8, 2019—(JP) Notice of Reasons for Rejection—App 2018-079205, Eng Tran.
Mar. 1, 2019—(CN) The Second Office Action—App 201610979544.6, Eng Tran.
Oct. 21, 2019—(CN) The Third Office Action—App 201610979544.6, Eng Tran.
Apr. 27, 2020—(CN) The Decision of Rejection—App 201610979544.6, Eng Tran.

* cited by examiner

IMAGE FORMING APPARATUS

CROSS REFERENCES TO RELATED APPLICATIONS

This application is a continuation of prior U.S. application Ser. No. 15/349049, filed Nov. 11, 2016, which is a continuation of prior U.S. application Ser. No. 13/852,795, filed Mar. 28, 2013, now U.S. Pat. No. 9,509,873, issued Nov. 29, 2016, which application claims priority from Japanese Patent Application No. 2012-100080, filed on Apr. 25, 2012 and No. 2012-139682, filed on Jun. 21, 2012, which are incorporated herein by reference.

FIELD OF DISCLOSURE

Aspects of the present disclosure relate to an image forming apparatus which includes an antenna portion for short range wireless communication.

BACKGROUND

A known image forming apparatus includes short-range wireless communication function which may be carried out between an image forming apparatus and a portable apparatus. The term "short range wireless communication" used herein is intended to signify wireless communication within a maximum range of, for example, 1 meter.

SUMMARY

However, if an antenna portion used for short-range wireless communication is disposed at an inappropriate position, then the operability of the image forming apparatus which utilizes a communication device such as a portable device degrades.

Therefore, it is desirable to provide an image forming apparatus which utilizes a communication device and is improved in operability.

DETAILED DESCRIPTION

Hereinafter, one or more aspects of the disclosure are described.

Figure 1:
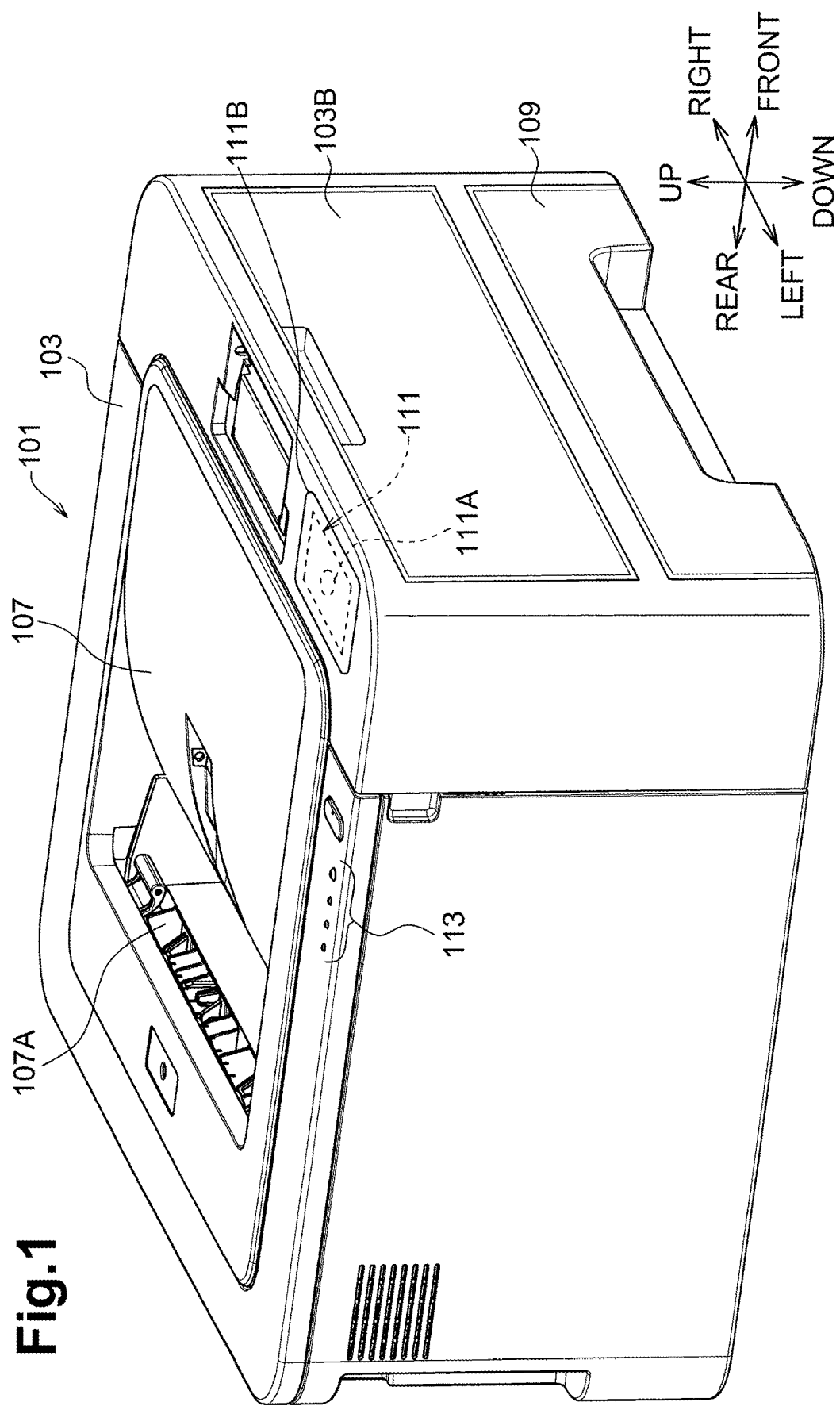
FIG. 1 is a perspective view showing an appearance of an image forming apparatus according to a first illustrative embodiment.

An image forming apparatus 1 according to an illustrative embodiment, illustrated in FIG. 1, is one practical example of an image forming apparatus according to aspects of the present disclosure. In short, the matters specifying the claimed invention are not limited to particular members, structures or the like exemplified by the following illustrative embodiments. In the following, the illustrative embodiments are described with reference to the drawings.

First Illustrative Embodiment

1. General Configuration of the Image Forming Apparatus

Figure 2:
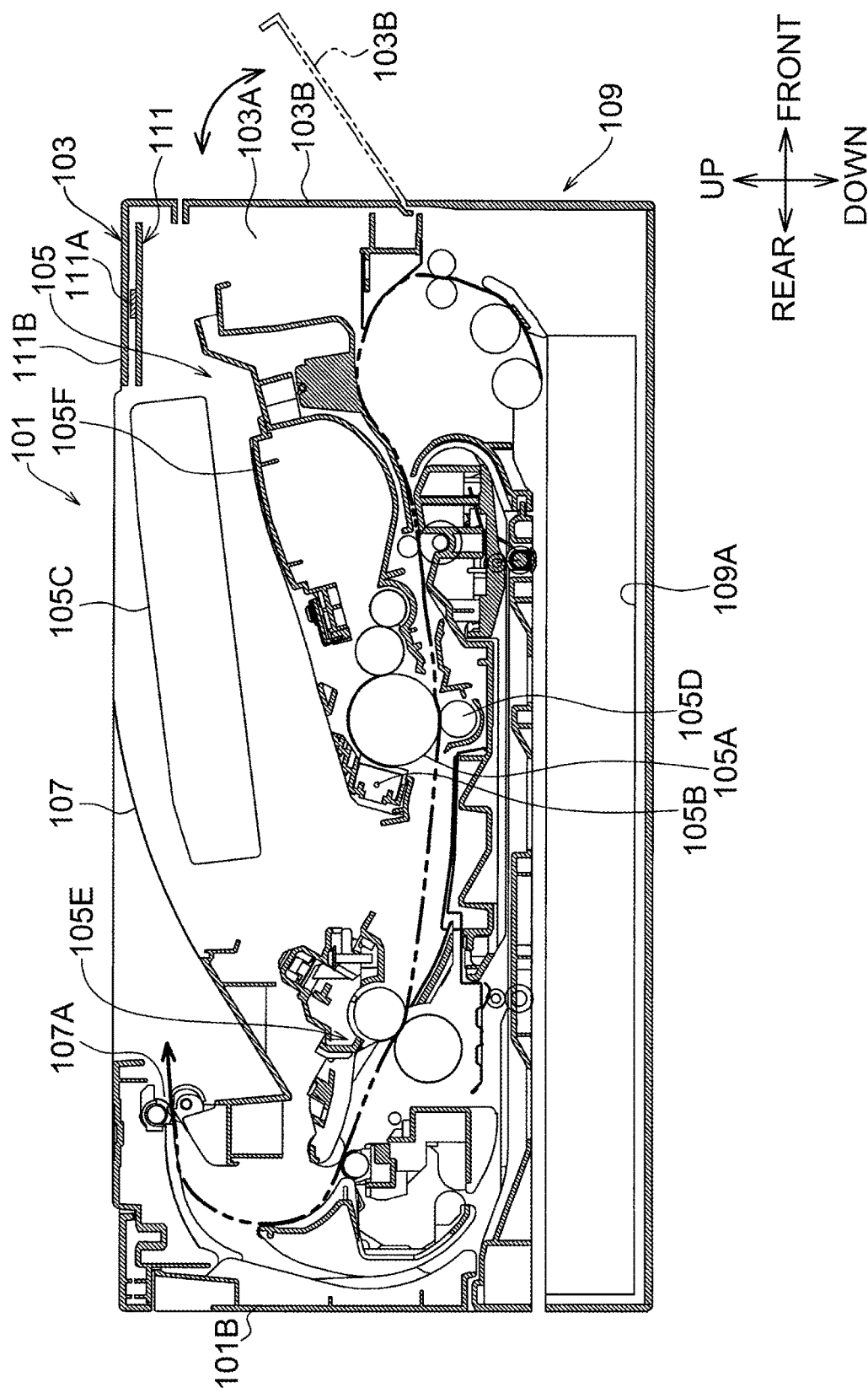
FIG. 2 is a central sectional view of the image forming apparatus of FIG. 1.
Figure 3:
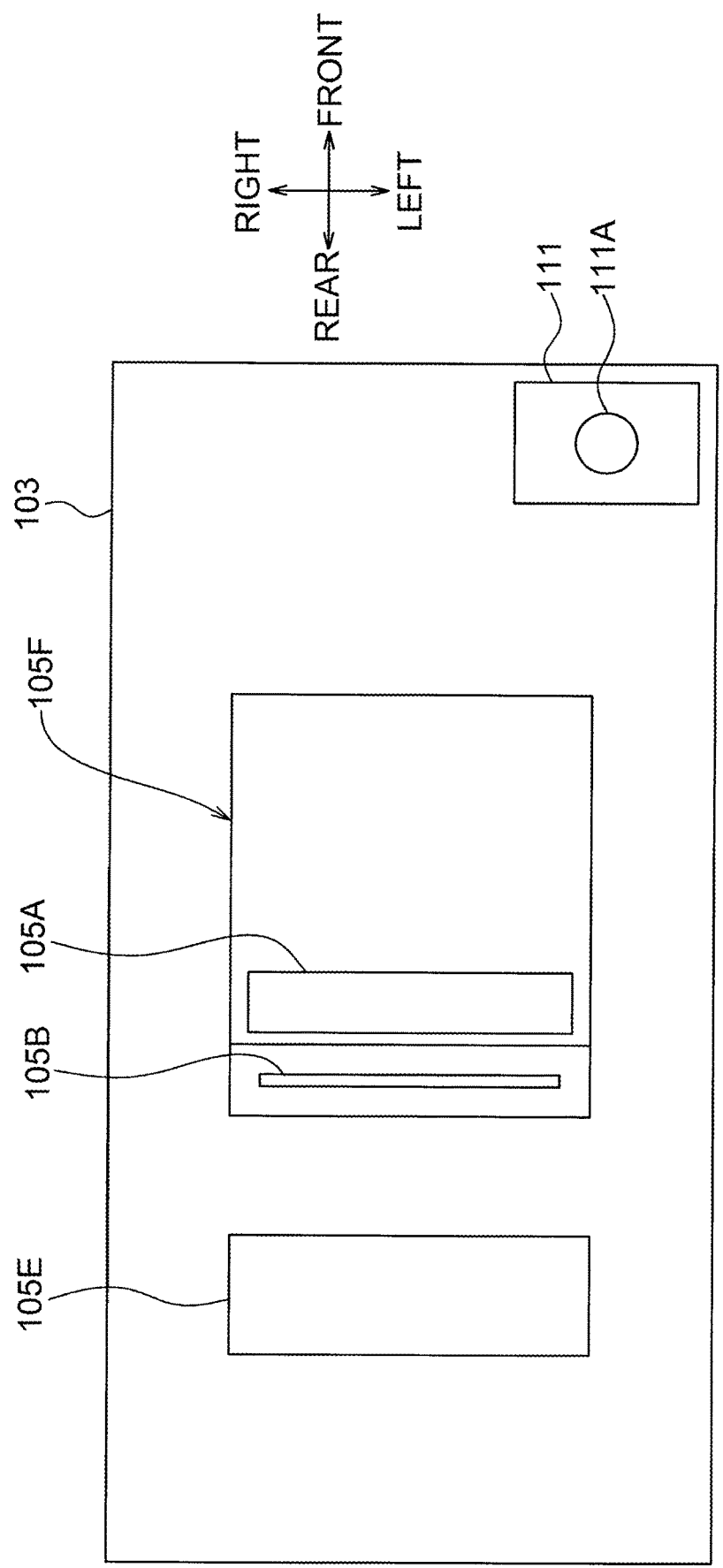
FIG. 3 is a projection view of the image forming apparatus of FIG. 1 to a horizontal plane.

Referring first to FIG. 1, a housing 103 of an image forming apparatus 101 according to the present illustrative embodiment configures a design surface appearance of the image forming apparatus 101. In the apparatus main body, namely, in the housing 103, an image forming unit 105 for forming an image on a sheet such as a paper sheet is accommodated as shown in FIG. 2.

It is to be noted that the image forming unit 105 in the present illustrative embodiment is an image forming unit of the monochromatic type or an image forming member of the xerographic type having a photosensitive member 105A, a charger 105B, an exposure unit 105C, a transfer member 105D, a fixing unit 105E and so forth.

The photosensitive member 105A carries a developer image thereon. The charger 105B charges the photosensitive member 105A. The exposure unit 105C exposes the surface of the charged photosensitive member 105A to form an electrostatic latent image on the surface of the photosensitive member 105A. Then, if charged developer is supplied to the photosensitive member 105A on which the electrostatic latent image is formed, then a developer image is carried on the surface of the photosensitive member 105A.

The transfer member 105D is configured to transfer the developer image carried on the photosensitive member 105A to a sheet and is disposed at a position opposing to the photosensitive member 105A. The fixing unit 105E fixes the developer image transferred to the sheet. It is to be noted that the fixing unit 105E in the present illustrative embodiment is a fixing device of the heating type which heats the developer to deposit the developer onto the sheet.

Then, the sheet for which image formation is completed is discharged from a discharge port 107A to a discharge tray 107. It is to be noted that the discharge port 107A in the present illustrative embodiment is open to the forward side at a rearward side upper portion of the housing 103. The discharge tray 107 is configured to have an inclined face which is inclined downward toward the discharge port 107A.

Below the image forming unit 105 in the housing 103, a feed tray 109 is disposed which has a receiving portion 109A on which a plurality of sheets can be placed. The feed tray 109 is removably mounted on the apparatus main body, namely, on the housing 103. In the present illustrative embodiment, the feed tray 109 may be mounted on and removed from the housing 103 by moving the feed tray 109 in forward and backward directions.

Sheets placed in a stacked state on the feed tray 109 are successively fed to the image forming unit 105 from the upper end side of the feed tray 109 in the stacking direction.

2. Antenna Portion for Short-Range Wireless Communication

In the housing 103, a communication board 111 having an antenna portion 111A for short-range wireless communication is disposed as shown in FIG. 2. Further, the image forming apparatus 101 according to the present illustrative embodiment carries out short-range wireless communication with a communication device such as a portable apparatus (not shown) through the antenna portion 111A. By such short-range wireless communication, for example, the following acts can be carried out.

In particular, (a) the image forming apparatus 101 can be operated through an operation unit of the communication device. (b) Image data to be formed on a sheet can be transmitted from the communication device to the image forming apparatus 101 directly without passing through a computer or the like so that it is printed by the image forming apparatus 101. Or, (c) by authenticating an owner of the communication device, an operation permitted in advance to the owner is executed while operations other than the permitted operation are prohibited.

A communication unit 111B which corresponds to the antenna portion 111A is provided at a position on the outer surface of the housing 103 at which the communication unit 111B may be seen without obstruction from the upper side as shown in FIG. 1.

In particular, the image forming apparatus 101 does not have any portion above the communication unit 111B. Therefore, in a region from above the communication unit 111B to the communication unit 111B, nothing blocks the field of vision of the user, and the user may see the communication unit 111B without obstruction from the upper side.

In particular, the communication unit 111B is provided on an upper face of a forward side of the housing 103. An operation region 113 which is operated by a user is provided on the front side of the housing 103. In particular, the communication unit 111B in the present illustrative embodiment is provided, at least in the forward and backward direction of the housing 103, on the same side as the operation region 113.

More particularly, the communication unit 111B is provided at a position displaced toward the front side with respect to the discharge tray 107 in the forward and backward direction of the housing 103. It is to be noted that the "front face side in the forward and backward direction of the housing 103" is a side of the housing 103 on which the operation region 113 is provided, for example, with respect to the center in the forward and backward direction.

Therefore, if the antenna portion 111A and the charger 105B are projected to a horizontal plane, then the antenna portion 111A projected to the horizontal plane is displaced with respect to the charger 105B projected to the horizontal plane. In other words, the antenna portion 111A projected to the horizontal plane is positioned on the opposite side to the fixing unit 105E projected to the horizontal plane across the charger 105B projected to the horizontal plane.

Further, the communication unit 111B is formed in a horizontally planar state as shown in FIG. 2. It is to be noted that the term "horizontal" signifies a horizontal state of such a degree that, when a communication device is placed on the communication unit 111B, the communication device does not slip down from the communication unit 111B, namely, from the housing 103. Further, the term "planar state" signifies a planar state of such a degree that, when a communication device is placed on the communication unit 111B, the communication device does not suffer from any significant rattle.

Further, an opening 103A and a front cover 103B are provided on the forward side of the housing 103. The opening 103A establishes communication between the inside and the outside of the housing 103. The front cover 103B is assembled to the housing 103 for displacement between a position at which the front cover 103B closes the opening 103A and a position at which the front cover 103B opens the opening 103A. It is to be noted that the front cover 103B in the present illustrative embodiment opens and closes the opening 103A by rocking displacement thereof around a lower end side thereof.

The antenna portion 111A is disposed on the upper side with respect to an upper end of the front cover 103B. In other words, the antenna portion 111A is positioned at a location displaced to the outer side from an outer edge of the opening 103A as viewed from the opening direction of the opening 103A, in the present illustrative embodiment, from the forward and backward direction.

It is to be noted that the opening 103A can allow a dismounting or mounting operation of a process unit 105F or a removing operation of a jamming sheet or the like to be carried out. Incidentally, the process unit 105F is a casing in which the photosensitive member 105A, developer and so forth can be accommodated.

3. Characteristics of the Image Forming Apparatus

In the present illustrative embodiment, since the communication unit 111B is provided at a position at which it can be seen without obstruction from the upper side, a communication device such as a smartphone can be brought close to or into contact with the communication unit 111B readily. Accordingly, since wireless communication between the antenna portion 111A and a communication device can be established reliably, the operability of the image forming apparatus which utilizes the communication device can be improved.

In the present illustrative embodiment, the antenna portion 111A is disposed such that the antenna portion 111A projected to the horizontal plane is displaced from the charger 105B projected to the horizontal plane. Therefore, the distance between the antenna portion 111A and the charger 105B may be made comparatively great. Accordingly, a situation in which the antenna portion 111A suffers from electric noise from the charger 105B may be suppressed.

In the present illustrative embodiment, the antenna portion 111A is disposed such that the antenna portion 111A projected to the horizontal plane is positioned on the opposite side to the fixing unit 105E projected to the horizontal plane across the charger 105B projected to the horizontal plane. Therefore, the antenna portion 111A can be spaced from the fixing unit 105E. Accordingly, where the fixing unit 105E of the heating type is adopted, the antenna portion 111A can be protected against the heat of the fixing unit 105E.

In the present illustrative embodiment, since the communication unit 111B is provided at a position displaced from the discharge tray 107, such a failure that a sheet placed on the discharge tray 107 makes an obstacle when a communication device is brought close to or into contact with the communication unit 111B can be prevented.

In the present illustrative embodiment, since the communication unit 111B is positioned on the upper face of the forward side of the housing 103, the user can bring a communication device close to or into contact with the communication unit 111B readily.

In the present illustrative embodiment, since the communication unit 111B is formed so as to have a horizontal planar shape, a communication device may be left in a state in the communication device when it is placed on the communication unit 111B. Accordingly, the user need not hold the communication device, and consequently, the image forming apparatus is improved in convenience in use.

In the present illustrative embodiment, since the antenna portion 111A is disposed on the upper side with respect to an upper end of the front cover 103B, the user can bring a communication device close to or into contact with the communication unit 111B readily, independent of the position of the front cover 103B.

In particular, if the communication unit 111B is provided otherwise on a movable member such as the front cover 103B, then since the position of the communication unit 111B is displaced depending upon the state of the movable member, it is difficult to bring a communication device close to or into contact with the communication unit 111B.

Second Illustrative Embodiment

Figure 4:
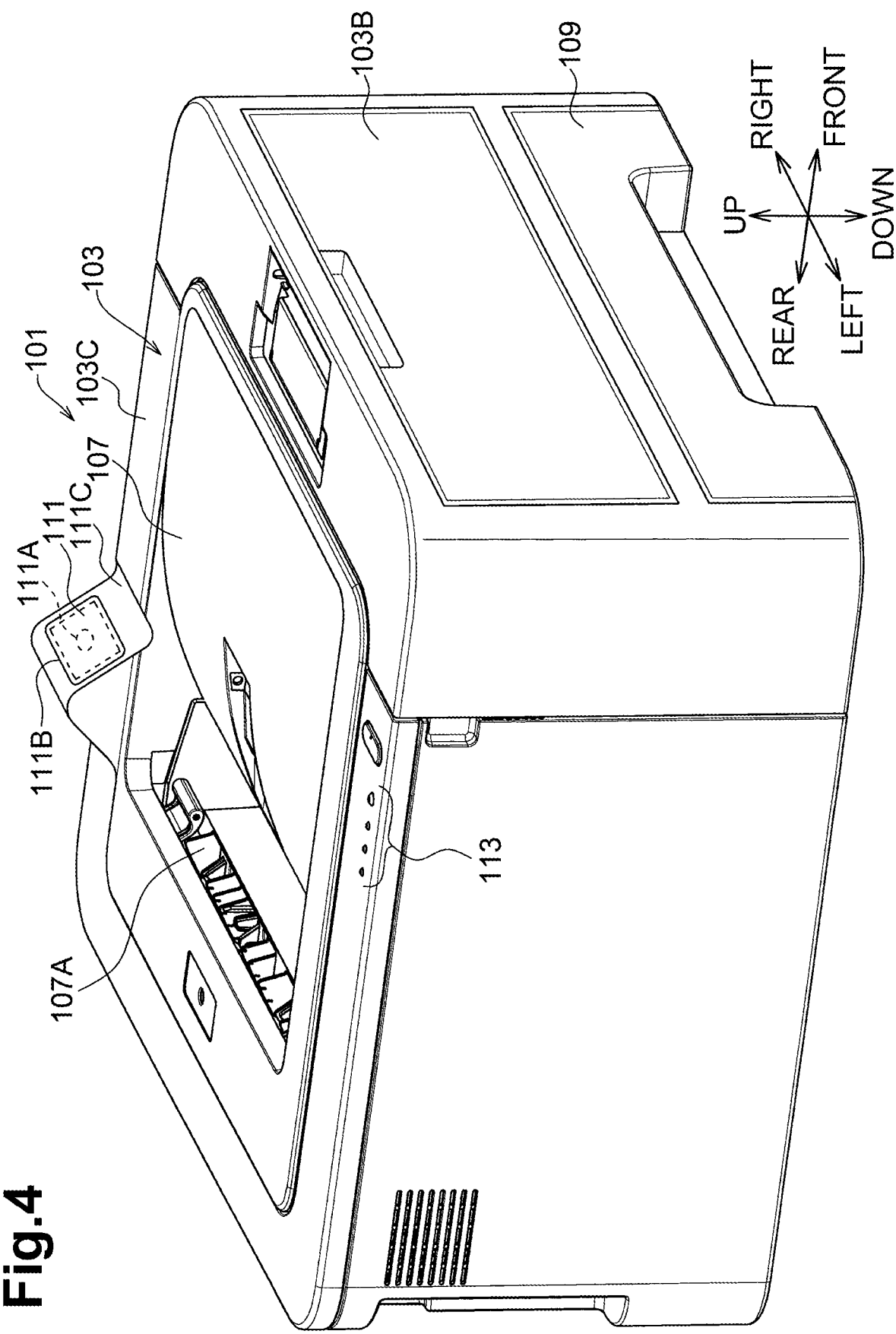
FIG. 4 is a perspective view showing an appearance of an image forming apparatus according to a second illustrative embodiment.

The communication unit 111B in the first illustrative embodiment is provided at a position displaced forwardly with respect to the discharge tray 107 in the forward and backward direction of the housing 103. However, in the present illustrative embodiment, the communication unit 111B is provided at a position displaced with respect to the discharge tray 107 in the leftward and rightward direction of the housing 103 as shown in FIG. 4.

Further, the communication unit 111B in the present illustrative embodiment is formed in an inclined planar shape which extends downwardly toward the forward side. Further, a holding member 111C for holding a communication device thereon is provided on the lower end side of the communication unit 111B.

It is to be noted that the inclined face of the housing 103 which configures the communication unit 111B may have any configuration. For example, the inclined face of the housing 103 may be formed integrally with a top cover 103C which configures the housing 103 or may be formed as a separate member from the top cover 103C and assembled to the top cover 103C.

Further, the communication unit 111B in the present illustrative embodiment is formed in an inclined planar shape which is inclined downwardly toward the forward side. Therefore, for example, where a display unit is provided on a communication device, the user can visually recognize the display unit readily while the communication device remains placed on the communication unit 111B.

Further, in the present illustrative embodiment, since the holding member 111C for holding a communication device is provided on the lower end side of the communication unit 111B, the user need not continue to hold the communication device. Accordingly, the image forming apparatus can be improved in convenience in use.

It is to be noted that, while the communication unit 111B in FIG. 4 is provided on the rear face side, namely, on the rearward side with respect to the center in the forward and backward direction, the present illustrative embodiment is not limited to this, but the communication unit 111B may be provided on the forward side.

Further, while, in FIG. 4, the holding member 111C is configured from a groove extending in the leftward and rightward direction, the present illustrative embodiment is not limited to this, but the holding member 111C may be configured, for example, from a projection which projects upwardly from the top cover 103C or a like element. Or, a flat face of the top cover 103C may be utilized as the holding member 111C, or else, the holding member 111C may be eliminated.

Third Illustrative Embodiment

Figure 5:
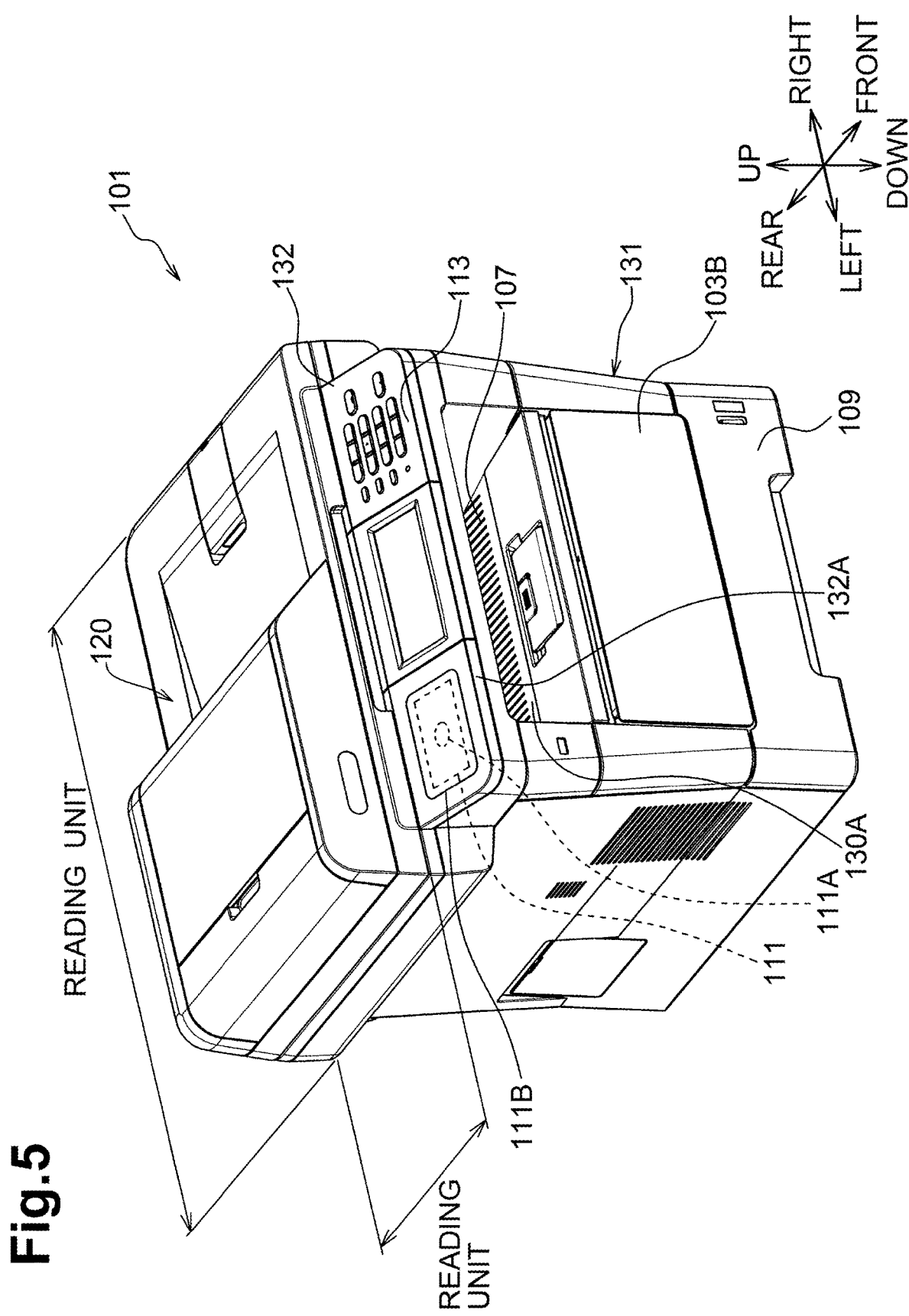
FIG. 5 is a perspective view showing an appearance of an image forming apparatus according to a third illustrative embodiment.

In the present illustrative embodiment depicted in FIG. 5, an image forming apparatus 101 with which a reading unit 120 for reading in image information described on a manuscript is integrated is shown.

In particular, the housing 103 in the present illustrative embodiment includes a first housing member 131 and a second housing member 132. The first housing member 131 accommodates the image forming unit 105 and corresponds to the housing in the first illustrative embodiment.

The second housing member 132 accommodates the reading unit 120 therein and is positioned at a location spaced above the first housing member 131 with a space 130A left therebetween. In short, the reading unit 120 is positioned at the location spaced above the discharge tray 107 with the space 130A therebetween.

Further, at a position of the second housing member 132 displaced from the reading unit 120, an operation panel 132A which configures part of the second housing member 132 and has the operation region 113 is provided. The communication unit 111B is provided on the operation panel 132A.

Accordingly, if the reading unit 120 and the antenna portion 111A are projected to a horizontal plane, then the antenna portion 111A projected to the horizontal plane is displaced from the reading unit 120 projected to the horizontal plane. Particularly, in the present illustrative embodiment, the operation panel 132A is displaced frontward with respect to the reading unit 120 and is provided at a position at which the operation panel 132A can be seen from the upper side without obstruction.

Therefore, in the present illustrative embodiment, the user may bring a communication device close to or into contact with the communication unit 111B readily without being obstructed by the reading unit 120.

Further, since the communication unit 111B is provided on the second housing member 132 disposed on the upper side with respect to the first housing member 131, the user can bring a communication device close to or into contact with the communication unit 111B readily from the upper side.

Although the communication unit 111B in the present illustrative embodiment is configured in an inclined planar shape similar to that in the second illustrative embodiment, the holding member 111C is not provided on the communication unit 111B as shown in FIG. 5. However, the present illustrative embodiment is not limited to this, but the holding member 111C may be provided otherwise on the lower end side of the communication unit 111B or the communication unit 111B may otherwise be formed in a horizontal planar shape.

Figure 6:
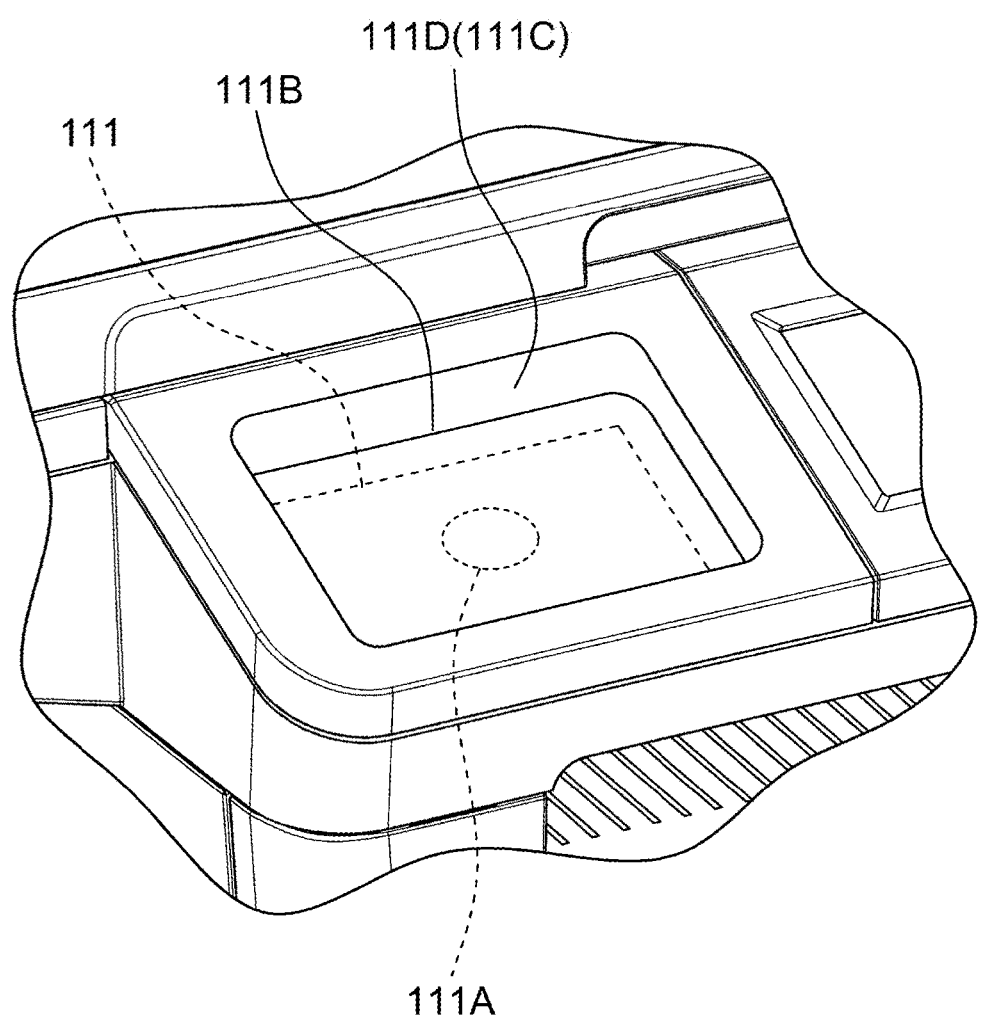
FIG. 6 is a partial perspective view showing a modification to the image forming apparatus of FIG. 5.

Further, where the holding member 111C is provided, it may be configured such that, for example, as shown in FIG. 6, a recessed portion 111D forms a recess in the upper face of the operation panel 132A that allows a communication device to be received therein. If such a configuration as just described is adopted, then since a communication device can fit into the recessed portion 111D, the recessed portion 111D can function as the holding member 111C.

Fourth Illustrative Embodiment

Figure 7:
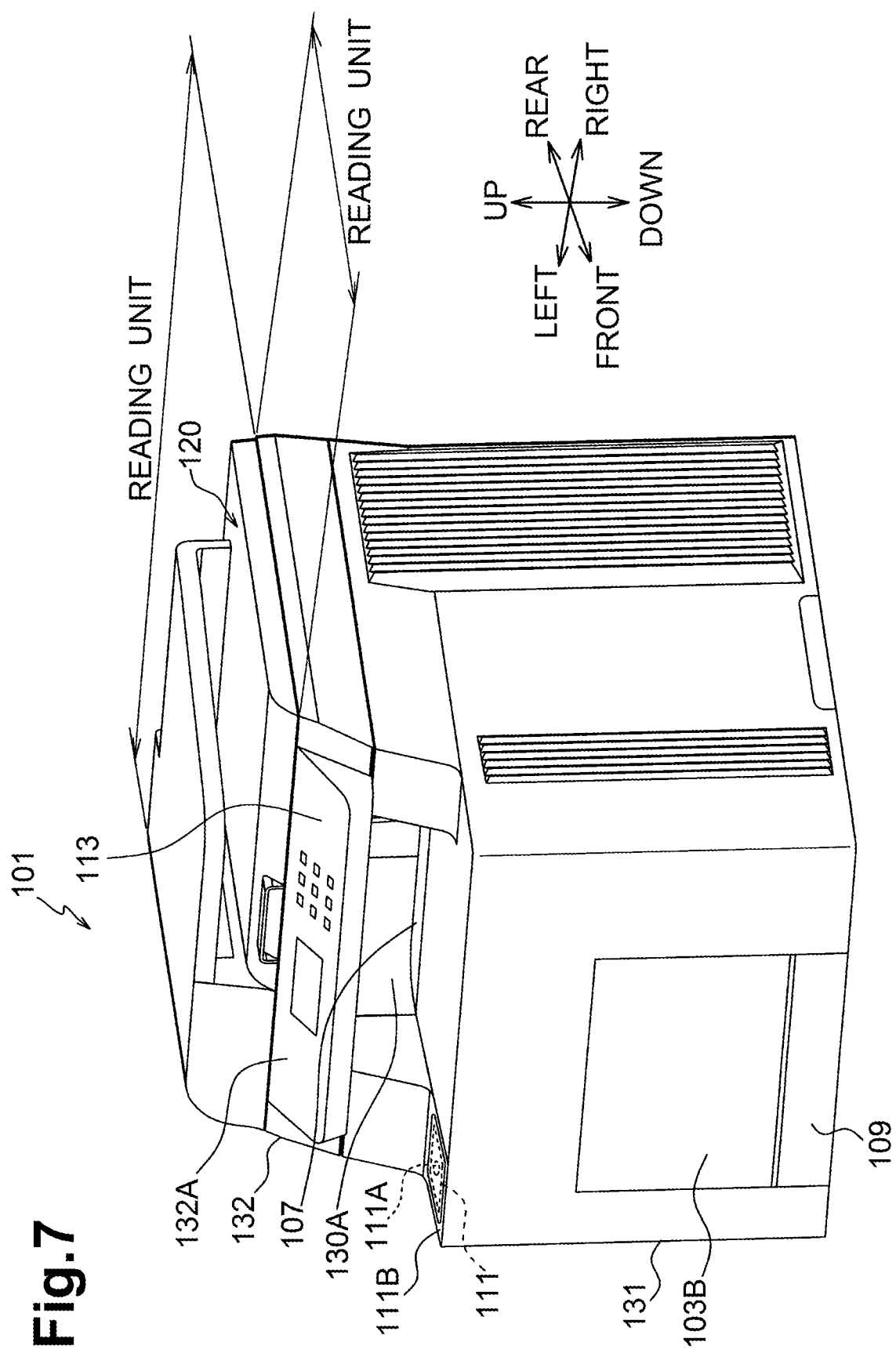
FIG. 7 is a perspective view showing an appearance of an image forming apparatus according to a fourth illustrative embodiment.

While, in the third illustrative embodiment, the communication unit 111B is provided in the second housing member 132, in the present illustrative embodiment, the communication unit 111B is provided at a position of the first housing member 131 at which the communication unit 111B can be seen without obstruction from the upper side as shown in FIG. 7.

Also in the present illustrative embodiment, if the reading unit 120 and the antenna portion 111A are projected to a horizontal plane, then the antenna portion 111A projected to the horizontal plane is displaced with respect to the reading unit 120 projected to the horizontal plane.

Therefore, also in the present illustrative embodiment, the user may bring a communication device close to or into contact with the communication unit 111B readily without being obstructed by the reading unit 120.

While the image forming units in the first to fourth illustrative embodiments described hereinabove are of the monochromatic xerography type, the present disclosure is not limited to this. In particular, the image forming unit may be of any type such as the color xerography type or the monochromatic or color ink jet type.

Further, the particular utilization form of the short-range wireless communication is not limited to that used in the illustrative embodiments described hereinabove but may be any other utilization form.

For example, a communication device having a display unit such as a liquid crystal panel may be used in such a utilization form that the display unit of the communication device functions as a display unit of the image forming apparatus through short-range wireless communication. Where the communication device is used as the display unit of the image forming apparatus, a configuration wherein the image forming apparatus does not have a display unit can be implemented. Therefore, reduction of the fabrication cost of the image forming apparatus can be anticipated.

Fifth Illustrative Embodiment

Figure 8:
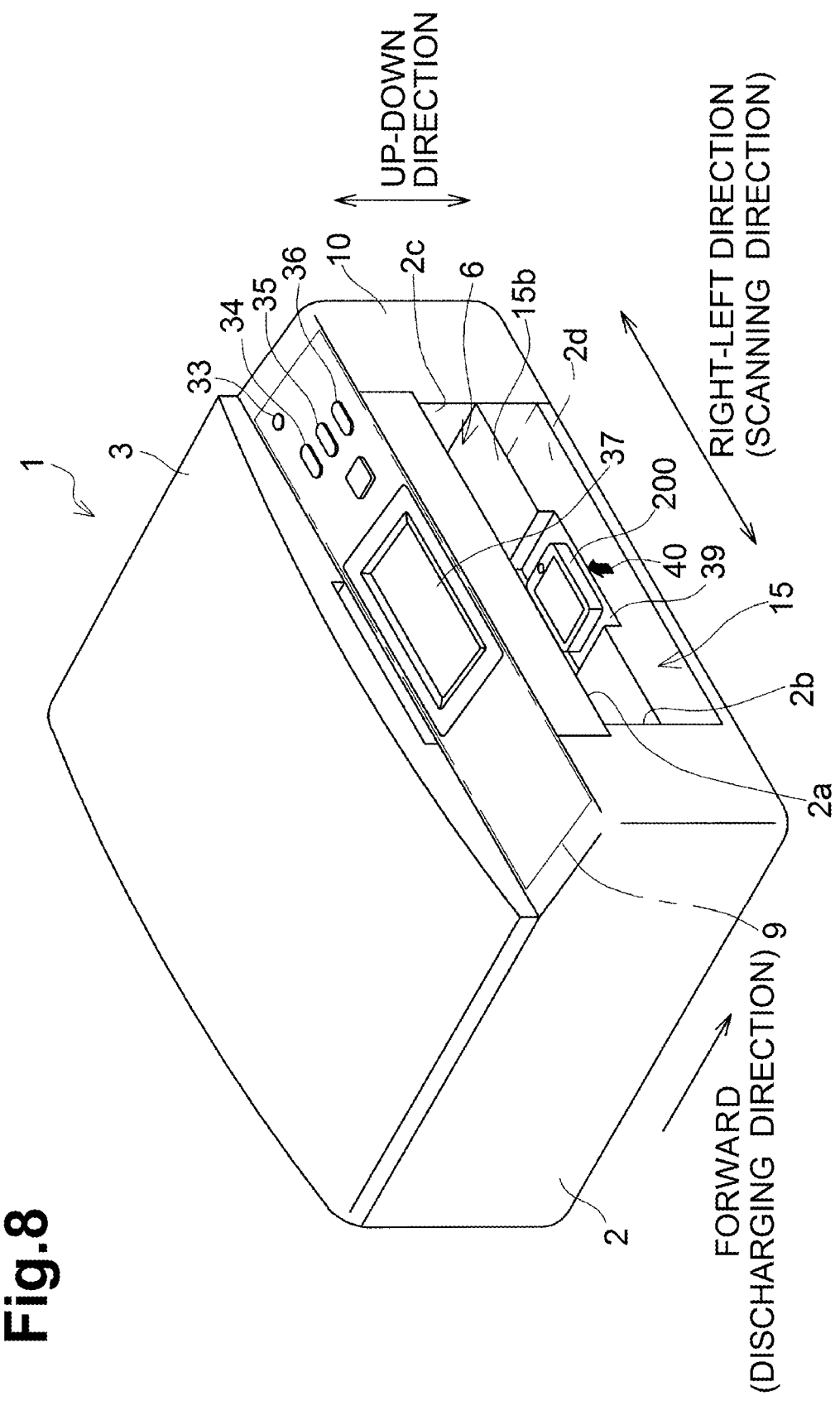
FIG. 8 is a perspective view showing an appearance of an ink jet printer according to a fifth illustrative embodiment.

A perspective view of an ink jet printer according to the fifth illustrative embodiment is shown in FIG. 8. It is to be noted that upward, downward, leftward, rightward, forward and backward directions are defined in an installation state illustrated in FIG. 8 in which the ink jet printer is used.

Figure 10:
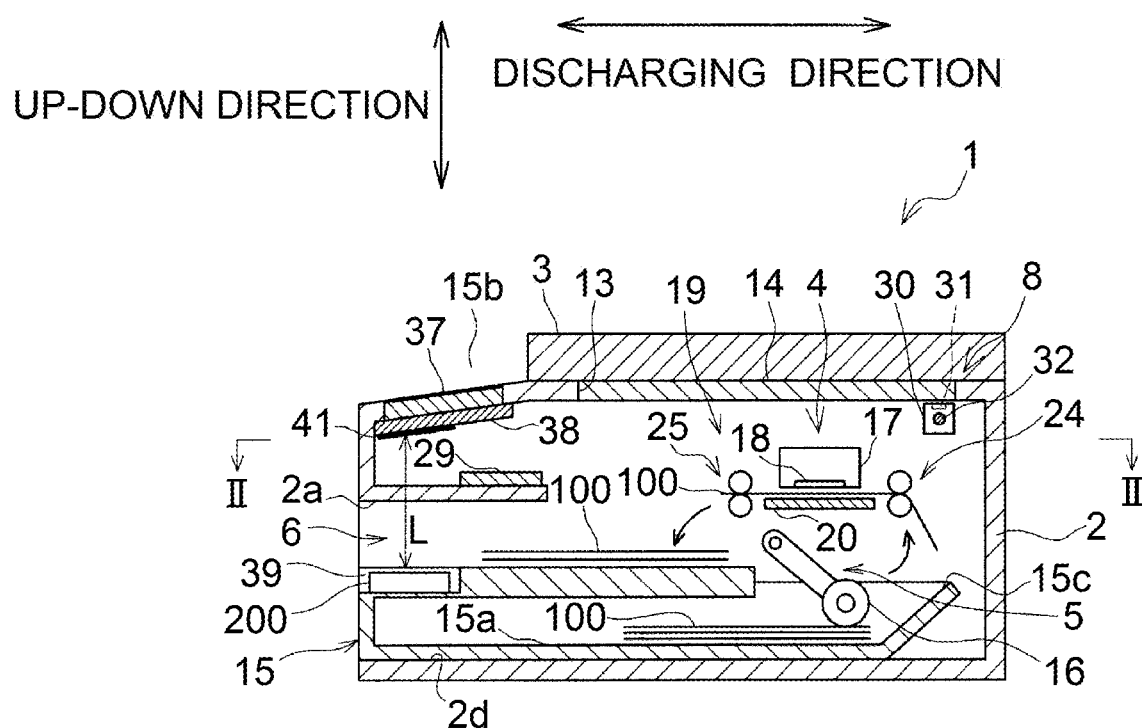
FIG. 10 is a sectional view taken along line I-I of FIG. 9.
Figure 11:
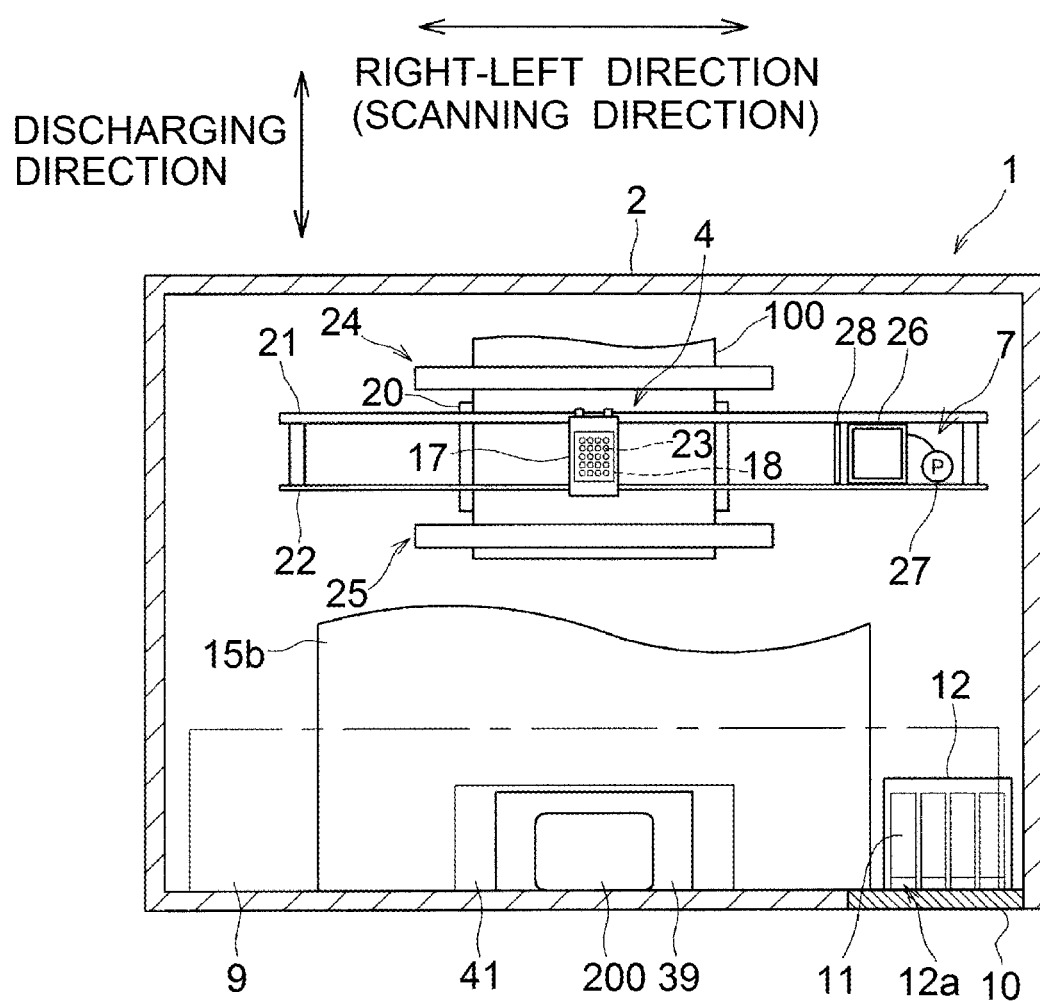
FIG. 11 is a sectional view taken along line II-II of FIG. 10.

Referring to FIG. 8, the ink jet printer 1 is a recording apparatus and also an image forming apparatus and includes a printer housing 2 formed from a synthetic resin material and a cover 3 attached for pivotal motion to the printer housing 2. An opening is formed at a front portion of the printer housing 2 and surrounded by an upper wall 2a, side walls 2b and 2c and a bottom wall 2d of the printer housing 2. As shown in FIG. 10, a control board 29 is disposed in a horizontal posture on an upper face of the upper wall 2a. In the control board 29, various circuits for controlling the ink jet printer 1 are incorporated. In FIG. 11, the upper wall 2a and the control board 29 are not shown.

Referring to FIGS. 10 and 11, the printer housing 2 accommodates a printer unit or recording unit 4 for recording an image and so forth on a recording paper sheet 100 which is recording medium, and a feeding mechanism 5 for feeding the recording paper sheet 100 to the printer unit 4.

The printer housing 2 further accommodates a discharge unit 6 into which the recording paper sheet 100 recorded by the printer unit 4 is discharged. The printer housing 2 further accommodates a maintenance unit 7 for carrying out maintenance of an ink jet head 18 of the printer unit 4, and a scanner unit 8 for reading an image, characters and so forth recorded on the recording paper sheet 100. An operation panel 9 for accepting various operations for the ink jet printer 1 by a user is disposed at a front portion of an upper face of the printer housing 2. It is to be noted that a configuration of the components is hereinafter described.

Referring to FIGS. 8 and 11, an opening and closing lid 10 is attached to the right end of a front face of the printer housing 2, and a holder 12 on which ink cartridges 11 are to be mounted is disposed behind the opening and closing lid 10. The holder 12 has four cartridge mounting portions 12a, into which four ink cartridges 11 in which inks of four colors, namely, cyan (C), magenta (M), yellow (Y) and black (BK, are stored individually, are removably mounted from the front.

Referring to FIG. 8, the cover 3 is disposed behind the operation panel 9 of the printer housing 2 and above the printer housing 2 in such a manner as to cover the upper face of the printer housing 2. Further, the cover 3 is attached to the printer housing 2 through a pivot shaft not shown provided at a rear end portion thereof such that it can be pivoted upwardly and downwardly with respect to the printer housing 2 around the pivot shaft.

Referring to FIG. 10, the feeding mechanism 5 includes a paper cassette 15 mounted on the printer housing 2, and a pickup roller 16 for picking up a recording paper sheet 100 from the paper cassette 15. The paper cassette 15 has a main tray 15a for holding the recording paper sheets 100 in a stacked state thereon and a discharge tray 15b provided above the main tray 15a for receiving the recording paper sheet 100 recorded by and discharged from the printer unit 4 hereinafter described. The pickup roller 16 is disposed above the main tray 15a and configured to rotate around a rotatable shaft provided on the printer housing 2. The pickup roller 16 is driven to rotate by a paper feed motor 80 shown in FIG. 13 to pick up the recording paper sheets 100 one by one from the main tray 15a of the paper cassette 15. The recording paper sheet 100 picked up by the pickup roller 16 is pushed upwardly along an inclined face 15c provided at an end portion of the paper cassette 15 and supplied to the printer unit 4.

Referring to FIGS. 10 and 11, the printer unit 4 is disposed in the printer housing 2 and carries out recording on a recording paper sheet 100. The printer unit 4 is disposed above the feeding mechanism 5. The printer unit 4 includes a carriage 17 mounted for back and forth movement in the leftward and rightward direction, namely, in a scanning direction, and an ink jet head 18 carried on the carriage 17. The printer unit 4 further includes a transport mechanism 19 for transporting a recording paper sheet 100 forwardly, namely, in a discharging direction, along a horizontal plane.

In the printer housing 2, a platen 20 for supporting a recording paper sheet 100 is disposed in a horizontal posture. Two guide rails 21 and 22 are provided above the platen 20 and extend in parallel to each other in the scanning direction. The carriage 17 is driven by a carriage driving motor 78 shown in FIG. 13 to move in the scanning direction, namely, in the leftward and rightward direction, along the two guide rails 21 and 22 in a region opposing the recording paper sheet 100 on the platen 20.

The ink jet head 18 is attached to a lower portion of the carriage 17 in a state in which a gap is provided between the ink jet head 18 and the platen 20. A lower face of the ink jet head 18 serves as an ink drop injection face 18a to which a plurality of nozzles 23 are opened. The nozzles 23 are arrayed along the discharging direction to configure four nozzle columns for injecting inks of the four colors, namely, of cyan, magenta, yellow and block. The ink jet head 18 carried on the carriage 17 is connected to the holder 12 described hereinabove through tubes not shown such that the inks of the four colors stored in the four ink cartridges 11 mounted on the holder 12 are supplied to the ink jet head 18 through the tubes.

The ink jet head 18 is movable together with the carriage 17 not only within a range within which it is opposed to a recording paper sheet 100 transported on the platen 20 but also to positions displaced to the left and right outer sides from the range. Particularly, the position on the right side with respect to the opposing range to the recording paper sheet 100 is a standby position at which the carriage 17 stands by when the ink jet head 18 is not used. When the carriage 17 arrives at the standby position, it opposes the maintenance unit 7 hereinafter described which is disposed below the carriage 17.

The transport mechanism 19 includes two transport roller pairs 24 and 25 disposed forward and rearward in such a manner that the platen 20 and the carriage 17 are positioned therebetween. The transport roller pairs 24 and 25 are driven by a transport motor 79 shown in FIG. 13 to transport a recording paper sheet 100 forwardly, namely, in the discharging direction, between the ink jet head 18 and the platen 20.

In the printer unit 4 described above, while the carriage 17 is moved in the scanning direction, namely, in the leftward and rightward direction, ink is injected from the ink jet head 18 to a recording paper sheet 100 on the platen 20 and the recording paper sheet 100 is transported in the discharging direction by the two transport roller pairs 24 and 25 to record a desired image or characters on the recording paper sheet 100.

Figure 9:
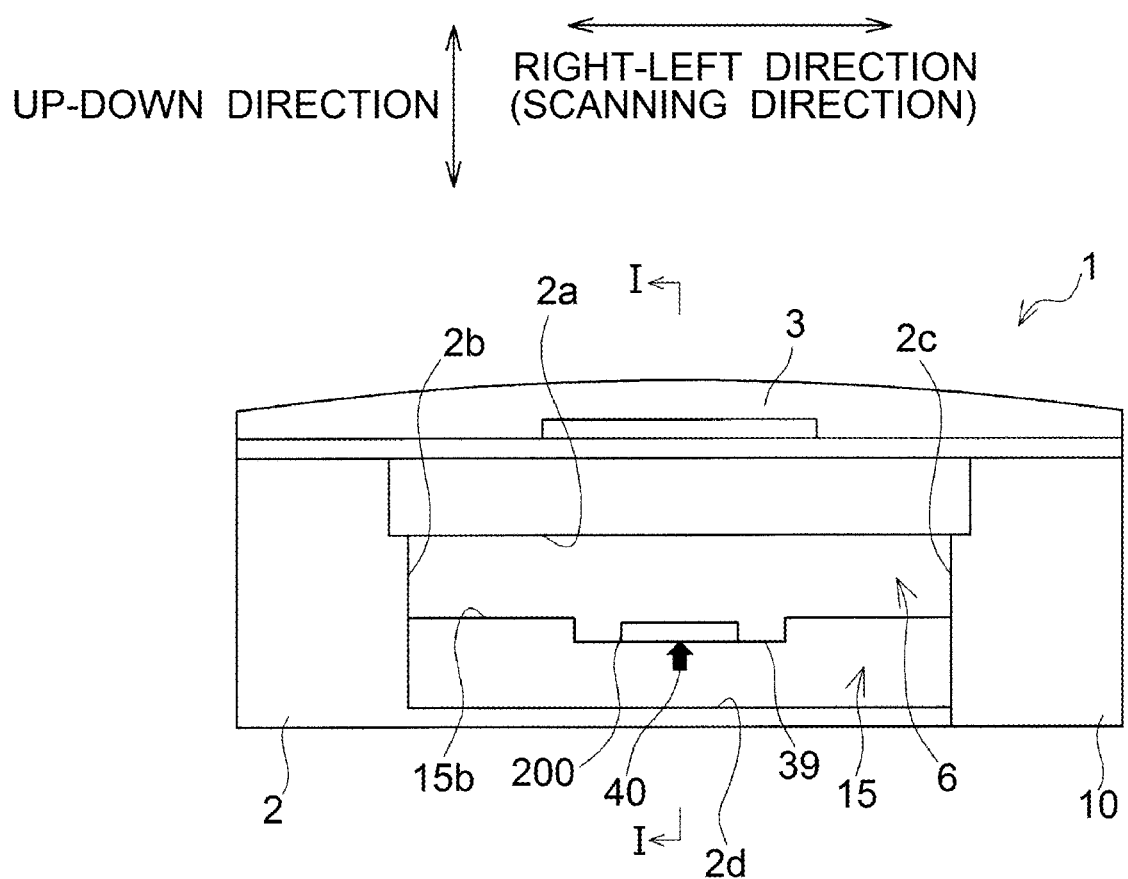
FIG. 9 is a front view of the ink jet printer of FIG. 8.

Referring to FIGS. 8 to 10, the above-described opening surrounded by the upper wall 2a, side walls 2b and 2c and bottom wall 2d is formed below the operation panel 9 at a front portion of the printer housing 2. The paper cassette 15 is mounted on the bottom wall 2d under the opening. The paper cassette 15 is removable from the printer housing 2. The discharge unit 6 is formed from the discharge tray 15b, namely, a discharge face of the discharge tray 15b, at the top of the paper cassette 15, and an opening region above the paper cassette 15 surrounded by the discharge tray 15b and the upper wall 2a and side walls 2b and 2c of the printer housing 2. A recording paper sheet 100 recorded by the printer unit 4 is transferred forwardly by the transport roller pairs 24 and 25 and placed on the discharge tray 15b of the discharge unit 6. In this manner, the discharge unit 6 is formed in the printer housing 2, and the recording paper sheet 100 recorded by the printer unit 4 is discharged to the discharge unit 6. The user can take out the recording paper sheet 100 placed on the discharge tray 15b from the front of the discharge unit 6.

Referring to FIG. 11, the maintenance unit 7 is disposed at a position on the right side of the platen 20, namely, at a position opposing the ink jet head 18 when the ink jet head 18 stands by at the standby position. The maintenance unit 7 includes a cap member 26 which closely contacts with the ink drop injection face 18a of the ink jet head 18 to cover the openings of the nozzles 23. The maintenance unit 7 further includes a suction pump 27 for compulsorily discharging ink from the nozzles 23 covered with the cap member 26 to the cap member 26, a wiper 28 for wiping off the ink sticking to the ink drop injection face 18a, and so forth.

Referring to FIG. 10, the scanner unit 8 includes a carriage 30 movable back and forth in the leftward and rightward direction, and an image scanner 31 carried on the carriage 30. At an upper portion in the printer housing 2, a guide rail 32 is provided such that it extends in parallel to the scanning direction, namely, in the leftward and rightward direction. When the carriage 30 is driven by a carriage driving motor not shown, it moves in the scanning direction, namely, in the leftward and rightward direction, along the guide rail 32 within a range opposing a plate member 14 fitted in an opening 13 in the printer housing 2. Thereupon, the recording paper sheet 100 is scanned by the image scanner 31. In other words, the ink jet printer 1 of the present illustrative embodiment is configured as a composite machine which can execute printing, scanning, copying and so forth.

Referring to FIGS. 8 and 10, the operation panel 9 is provided at a front portion of an upper face of the printer housing 2 and above the discharge unit 6, and has various operation buttons 33 to 36, a liquid crystal display unit 37 of the touch panel type, and so forth. The liquid crystal display unit 37 displays various kinds of information thereon, and the user can operate the liquid crystal display unit 37 to instruct the ink jet printer 1 to carry out various operations. A large number of conductors for the liquid crystal display unit 37 and so forth are disposed on the operation panel 9. A panel controlling board 38 for controlling the operation panel 9 is provided below the operation panel 9 as shown in FIG. 10. A panel controlling circuit 81 shown in FIG. 13 for controlling the operation panel 9 and associated elements is incorporated in the panel controlling board 38.

The ink jet printer 1 according to the present illustrative embodiment carries out communication by the NFC (Near Field Communication), which is a type of short-range wireless communication, with a communication terminal 200 such as a portable telephone set or a smartphone. Consequently, the ink jet printer 1 can receive recording data of an image or characters from the communication terminal 200. In the following, a configuration of the ink jet printer 1 which relates to the short-range wireless communication is described.

Figure 12:
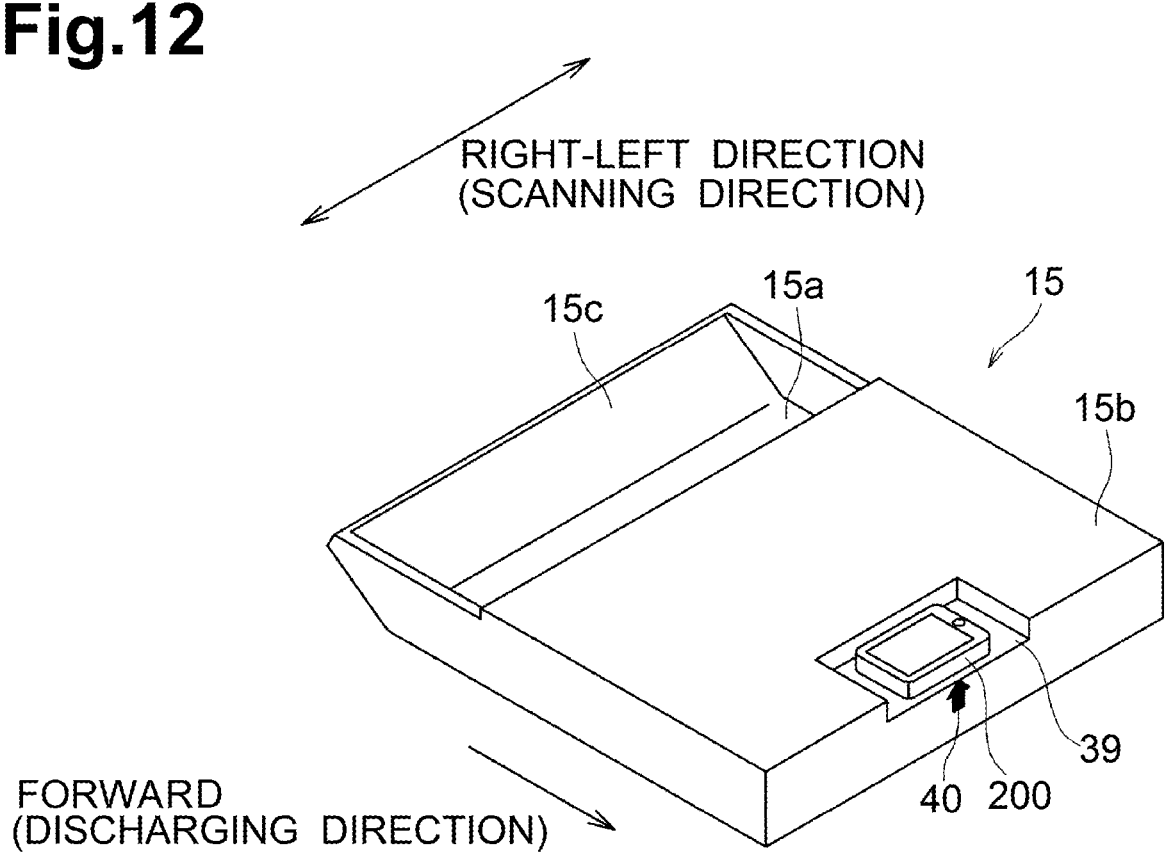
FIG. 12 is a perspective view of a paper cassette.

Referring to FIGS. 8 to 11, a terminal receiving member 39 on which the communication terminal 200 can be placed is provided in the discharge unit 6. In particular, the terminal receiving member 39 is a recessed portion provided on the discharge tray 15b on which a recording paper sheet 100 recorded by the printer unit 4 is to be placed as shown also in FIG. 12. Further, the terminal receiving member 39 is formed in a substantially rectangular shape at a central portion at a front end portion of the discharge tray 15b. Furthermore, the terminal receiving member 39 has an extent sufficient to accommodate the communication terminal 200 therein and has a depth with which the communication terminal 200 does not project upwardly from the terminal receiving member 39 in a state in which the communication terminal 200 is mounted in the terminal receiving member 39. The user can place the communication terminal 200 readily into the terminal receiving member 39 from the front of the discharge unit 6. Below the terminal receiving member 39 of the paper cassette 15, a mark 40 which indicates the position of the terminal receiving member 39 and is, in the present illustrative embodiment, an arrow mark, is applied.

According to FIG. 10, an antenna 41 serving as a communication unit may communicate by the NFC with the communication terminal 200 received in the terminal receiving member 39. In particular, the antenna 41 is a loop antenna and is disposed on a lower face, namely, the reverse face, of the panel controlling board 38. Further, the antenna 41 is disposed on a lower face of the panel controlling board 38 disposed in a substantially horizontal posture such that the loop portion thereof lies substantially in parallel to the horizontal direction. Further, the antenna 41 is disposed substantially directly above the terminal receiving member 39 such that the distance L between the terminal receiving member 39 and the antenna 41 is within 10 cm which is a maximum communication distance by the NFC. Another loop antenna not shown is built in the communication terminal 200 such that the loop portion thereof extends in parallel to a direction perpendicular to the thickness direction of the communication terminal 200. Therefore, if the communication terminal 200 is installed on the horizontal bottom face of the terminal receiving member 39, then the loop portions of the antenna 41 of the ink jet printer 1 and the antenna of the communication terminal 200 oppose substantially in parallel to each other.

If the communication terminal 200 is received in the terminal receiving member 39, then communication by NFC is carried out between the antenna 41 on the ink jet printer 1 side and the antenna on the communication terminal 200 side. More particularly, if a magnetic field is generated from one of the loop antenna 41 of the ink jet printer 1 side and the loop antenna of the communication terminal 200 side, then induced current is generated in the other antenna by electromagnetic induction. Consequently, data is transmitted from the one antenna to and received by the other antenna. Then, if the transmission (magnetic field generation) function and the reception (induced current generation) function of both antennae are changed over alternately, then bidirectional communication can be achieved between the ink jet printer 1 and the communication terminal 200.

Figure 13:
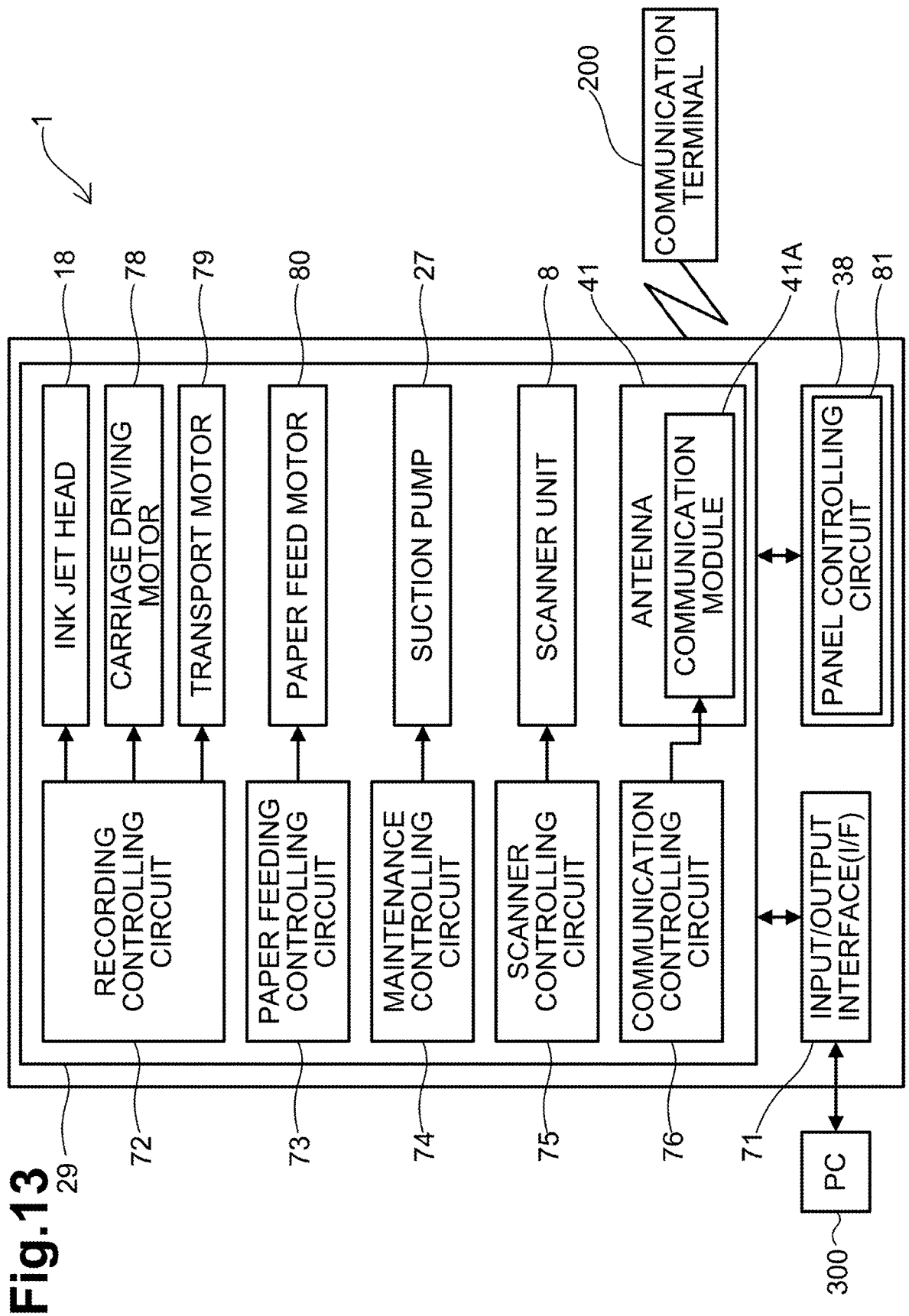
FIG. 13 is a block diagram schematically showing an electric configuration of the ink jet printer of FIG. 8.

Now, an electric configuration of the ink jet printer 1 is described. FIG. 13 is a block diagram schematically showing an electric configuration of the ink jet printer 1. Referring to FIG. 13, the control board 29 for controlling operation of the ink jet printer 1 is connected for data communication with a PC (personal computer) 300, which is an external apparatus, through an input/output interface (I/F) 71 such that recording data of an image or characters to be recorded are inputted from the PC 300 to the control board 29. Further, the panel controlling board 38 in which the panel controlling circuit 81 is incorporated is connected to the control board 29 such that various operations from the operation panel 9 are inputted as various signals relating to operation of the ink jet printer 1 to the control board 29 through the panel controlling circuit 81.

Various circuits are incorporated in the control board 29. In particular, a recording controlling circuit 72 for controlling recording operation of the printer unit 4, which includes the ink jet head 18 and so forth, based on received recording data, and a paper feeding controlling circuit 73 for controlling paper feeding operation by the feeding mechanism 5 are incorporated. Further, a maintenance controlling circuit 74 for controlling maintenance operation by the maintenance unit 7, a scanner controlling circuit 75 for controlling scanning of a recording paper sheet by the scanner unit 8 and a communication controlling circuit 76 for controlling data communication by the NFC with the communication terminal 200 are incorporated.

In the following, communication by NFC controlled by the communication controlling circuit 76, particularly reception of recording data, is described. The communication controlling circuit 76 is connected to a communication module 41a of the antenna 41. In the ink jet printer 1, communication with the communication terminal 200 by NFC is started by the user operating the liquid crystal display unit 37 of the operation panel 9 to input a predetermined instruction. When a communication starting instruction is inputted, the communication controlling circuit 76 carries out communication with the communication terminal 200. At this time, if the communication terminal 200 is placed into the terminal receiving member 39 by the user and then the communication with the communication terminal 200 is carried out normally, then the reception of the recording data is completed. On the other hand, even if a predetermined period of time elapses, if the communication with the communication terminal 200 is not carried out normally, then a message representing that communication is not carried out normally is displayed on the liquid crystal display unit 37. In this manner, recording data received by the antenna 41 are sent from the communication controlling circuit 76 to the recording controlling circuit 72 similarly to recording data received from the PC 300, and the recording operation by the printer unit 4 is controlled based on the recording data.

The ink jet printer 1 according to the present illustrative embodiment described above includes a printer housing 2, a printer unit 4 disposed in the printer housing 2 for carrying out recording on a recording paper sheet 100, a discharge unit 6 formed in the printer housing 2 for receiving the recording paper sheet 100 recorded by the printer unit 4 and discharged thereto, a terminal receiving member 39 provided on the discharge unit 6 for receiving a communication terminal 200 placed therein, and an antenna 41 for communicating with the communication terminal 200 placed in the terminal receiving member 39 by short-range wireless communication.

In the ink jet printer 1 according to the present illustrative embodiment configured in such a manner as described above, the terminal receiving member 39 in which the communication terminal 200 can be received is provided on the discharge unit 6 to which a recording paper sheet 100 is discharged. The discharge unit 6 receives the recording paper sheet 100 discharged thereto and has a large opening to this side, namely, to the user side, so that the user can take out the discharged recording paper sheet 100 therethrough. Accordingly, it is easy for the user to place the communication terminal 200 into such a discharge unit 6 as just described. Further, since the terminal receiving member 39 is provided on the discharge unit 6, a vacant space can be utilized effectively and a receiving space for the communication terminal 200 can be assured without increasing the size of the apparatus. Further, since the communication terminal 200 is received in the discharge unit 6 which has a large opening, the communication terminal 200 can be visually recognized readily by the user, and the communication terminal 200 can be prevented from being left in the terminal receiving member 39.

Further, since the terminal receiving member 39 is provided on the discharge tray 15b of the discharge unit 6 on which a recording paper sheet 100 recorded by the printer unit 4 is to be placed, the user can place the communication terminal 200 readily into the terminal receiving member 39.

Further, since the terminal receiving member 39 is a recessed portion formed on the discharge tray 15b of the discharge unit 6 and capable of accommodating the communication terminal 200 therein, the communication terminal 200 is accommodated into the recessed portion formed on the discharge tray 15b of the discharge unit 6. Consequently, when a recording paper sheet 100 is discharged, it is less likely to contact the communication terminal 200.

Further, the operation panel 9 and the panel controlling board 38 for controlling the operation panel 9 are disposed above the discharge unit 6 and the antenna 41 is disposed on the panel controlling board 38. Therefore, communication between the communication terminal 200 and the antenna 41 can be carried out reliably. Further, the panel controlling board 38 is positioned on the reverse side of the operation panel 9. Namely, the operation panel 9 is positioned on the opposite side to the communication terminal 200 across the panel controlling board 38. Accordingly, wireless communication between the antenna 41 provided on the panel controlling board 38 and the communication terminal 200 is not obstructed by the operation panel 9 which includes a large number of conductors.

Further, since the mark 40 indicating the position of the terminal receiving member 39 may be applied, the user can readily recognize the place at which the communication terminal 200 is to be placed.

While the fifth illustrative embodiment of the present disclosure is described above, the mode to which the present disclosure can be applied is not limited to the illustrative embodiment described hereinabove but can be changed suitably without departing from the subject matter of the present disclosure.

Figure 14:
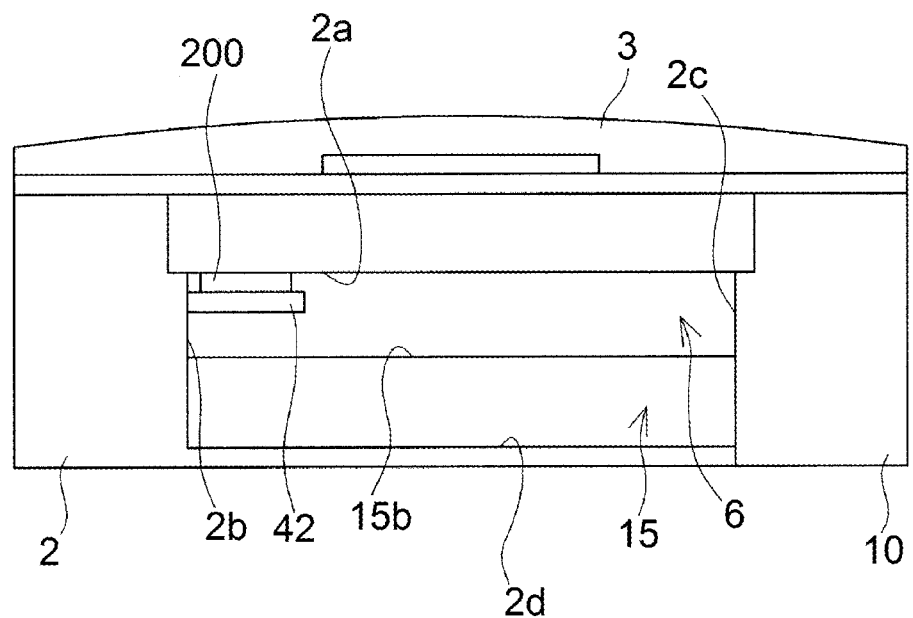
FIGS. 14 and 15 are front views of ink jet printers having different modified forms of a terminal receiving member.

In particular, in a recording apparatus according to a modification, a terminal receiving member 42 is provided at a position spaced from the discharge tray 15b of the discharge unit 6 as shown in FIG. 14. In particular, referring to FIG. 14, the terminal receiving member 42 is a table provided on the discharge unit 6 and extending horizontally from the side wall 2b of the printer housing 2 above the discharge tray 15b such that the communication terminal 200 can be placed on the table. According to the present modification, since the terminal receiving member 42 is provided at a position spaced from the discharge tray 15b of the discharge unit 6, the communication terminal 200 is placed at a position spaced from the discharge tray 15b of the discharge unit 6. Consequently, a recording paper sheet 100 discharged along the discharge tray 15b is less likely to contact the communication terminal 200. Further, since the distance of the communication terminal 200 to the antenna 41 provided on the panel controlling board 38 is reduced in comparison with the fifth illustrative embodiment described above, wireless communication between the antenna 41 and the communication terminal 200 is enhanced.

Figure 15:
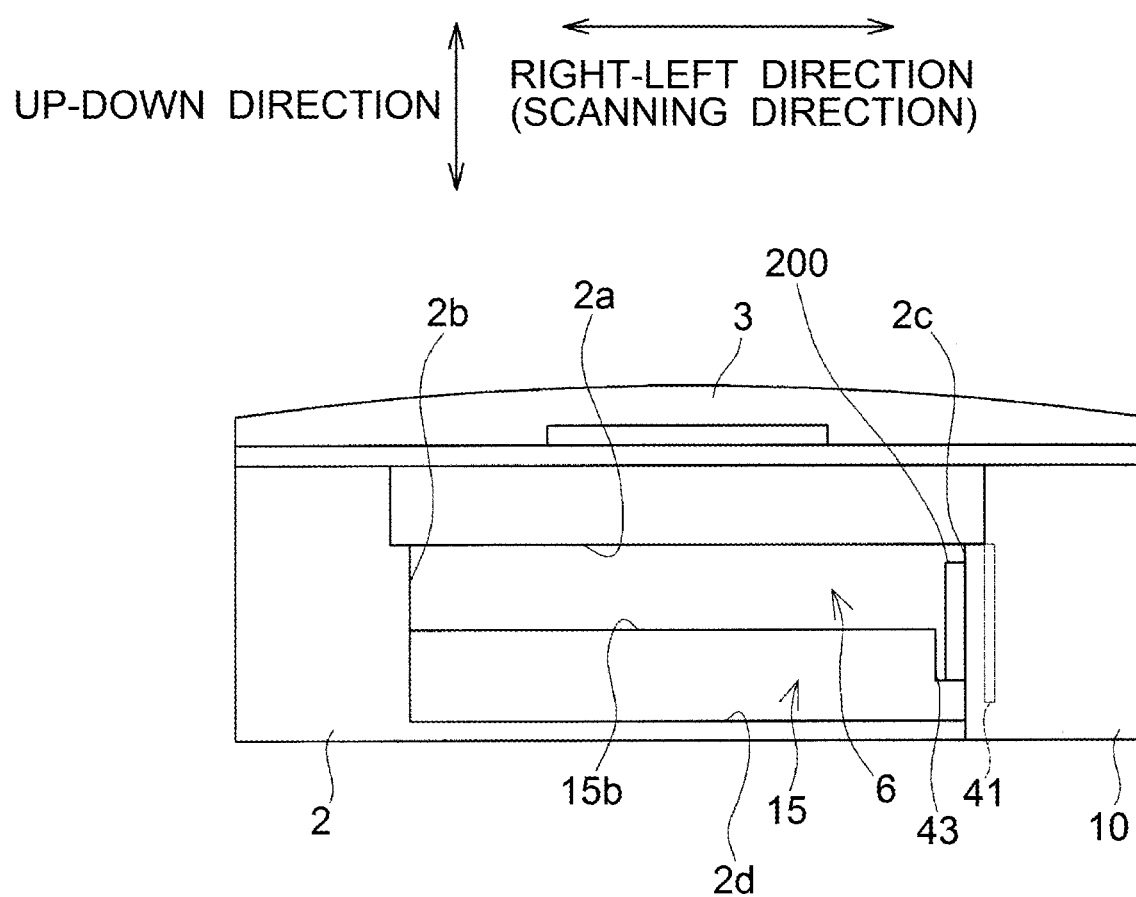
Figure 16:
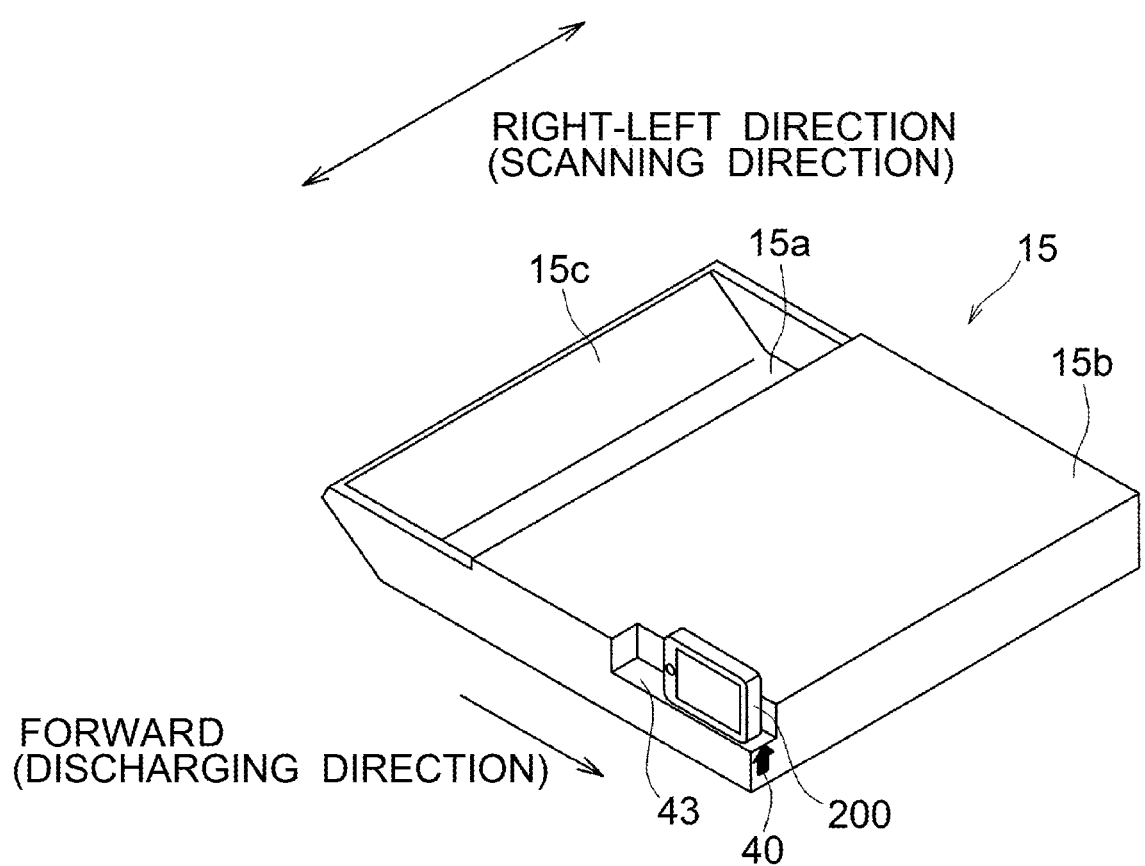
FIGS. 16 and 17 are perspective views of further different modified forms of the terminal receiving member.

In a recording apparatus according to another modification, a terminal receiving member 43 is a groove which is formed in a region of the discharge tray 15b of the discharge unit 6 on the end side in the widthwise direction of a recording paper sheet 100 perpendicular to the discharging direction of the recording paper sheet 100 and extends in the discharging direction of the recording paper sheet 100 as shown in FIGS. 15 and 16. In this instance, the antenna 41 is provided in parallel to the terminal receiving member 43. For example, the antenna 41 can be provided in parallel to the terminal receiving member 43 on a cartridge controlling board not shown, in which a cartridge controlling circuit not shown for controlling the ink cartridges 11 is incorporated, or on a side face of the printer housing 2. According to this modification, if the communication terminal 200 of a flattened shape is inserted into the groove formed at the end portion of the discharge unit 6 in a state in which the communication terminal 200 stands uprightly, then the communication terminal 200 can be disposed along an inner side face of the discharge unit 6. Accordingly, a discharged recording paper sheet 100 is less likely to contact the communication terminal 200.

Figure 17:
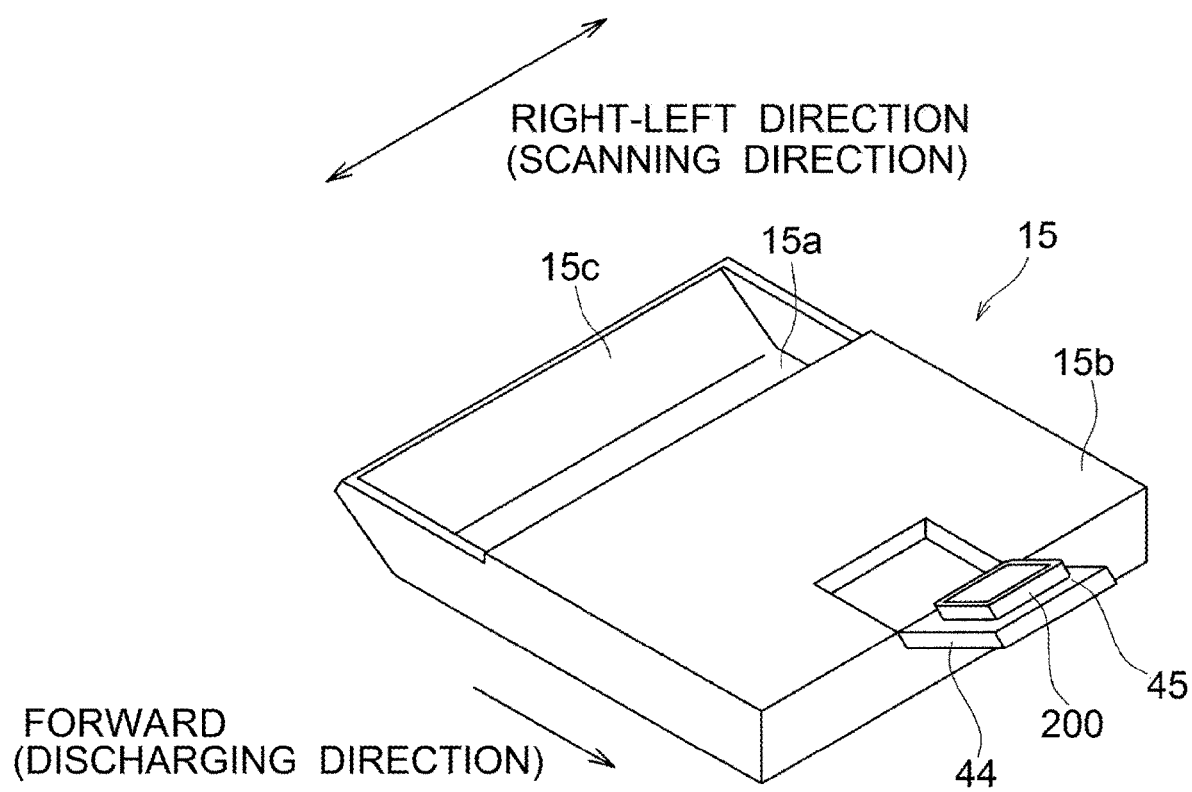

In a recording apparatus according to a further modification, an upper face of an auxiliary tray 44 serves as a terminal receiving member 45 by which the communication terminal 200 is received as shown in FIG. 17. The auxiliary tray 44 can move out from the discharge tray 15b of the discharge unit 6 to the discharging side of a recording paper sheet 100. In particular, the auxiliary tray 44 is attached to the discharge tray 15b through a pivot shaft not shown provided at a rear end portion thereof such that it is pivoted around the pivot shaft to move out to the discharging side of a recording paper 100 from the discharge tray 15b. By this auxiliary tray 44, a recording paper sheet 100 discharged to the discharging side is prevented from moving out from the discharge unit 6. In this instance, the antenna 41 is provided on the auxiliary tray 44. According to the present modification, since the upper face of the auxiliary tray 44 is the terminal receiving member 45 by which the communication terminal 200 is to be received, when the communication terminal 200 is mounted on the auxiliary tray 44 moved out from the discharge unit 6, a recording paper sheet 100 discharged from the discharge unit 6 is prevented with a higher degree of certainty from moving out by the communication terminal 200. Further, since the antenna 41 is provided on the auxiliary tray 44, the distance between the communication terminal 200 provided on the auxiliary tray 44 and the antenna 41 is very short, and consequently, wireless communication between them can be carried out reliable. While the auxiliary tray 44 in the present modification is provided for pivotal motion on the discharge tray 15b, it may otherwise be provided for sliding movement on the discharge tray 15b such that it can be drawn out forwardly.

The terminal receiving member 45 may otherwise be provided on an upper face of the main tray 15a in the inside of the paper cassette 15. In this instance, the antenna 41 is provided on the main tray 15a.

Further, since the antenna 41 is connected to the communication module 41a, it can be provided on a board, in the fifth illustrative embodiment described hereinabove, on the panel controlling board 38. Here, to provide a board for exclusive use for the antenna 41 in order to mount the antenna 41 is not preferable because of increase of the cost, increase of the scale of the apparatus and so forth. Therefore, preferably the antenna 41 is provided on an ink cartridge board as in the modification described hereinabove or on the control board 29. Where the antenna 41 is provided on the control board 29, the terminal receiving member 45 may be provided on the discharge tray 15b below the antenna 41.

Further, while, in the fifth illustrative embodiment described hereinabove, NFC is applied to carry out short-range wireless communication between the ink jet printer 1 and the communication terminal 200, alternatively an RFID (Radio Frequency Identification) tag or the like may be used to carry out short-range wireless communication. Further, the communication terminal is not limited to a portable telephone set, a smartphone or the like but may be an IC (Integrated Circuit) card, an IC tag or the like. Further, the data communicated by the short-range wireless communication is not limited to recording data but may be data such as log-in information to an ink jet printer.

Further, while, in the fifth illustrative embodiment described hereinabove, the upper face of the paper cassette 15 serves as the discharge tray 15b, the paper cassette 15 and the discharge tray 15b may not be formed as a unitary member but may be provided at positions spaced from each other while the upper face of the paper cassette 15 does not serve as the discharge tray 15*b*.

According to the aspects of the discloser, an image forming apparatus comprises a housing, an image forming unit, a discharge tray, a terminal receiving member, and an antenna.

The image forming unit disposed in the housing and configured to form an image on a sheet.

The discharge tray disposed in the housing and configured to receive the sheet on which an image is formed by the image forming unit. The terminal receiving member disposed on the discharge tray and configured to receive a communication terminal thereon. The antenna configured to communicate with the communication terminal received on the terminal receiving member by short-range wireless communication.

In the image forming apparatus, the terminal receiving member is a recessed portion formed on the discharge tray and configured to hold the communication terminal therein.

In the image forming apparatus, the terminal receiving member is a groove formed at a side of the discharge tray, the groove extending along a discharging direction in which a sheet is discharged from the image forming unit.

In the image forming apparatus, an operation unit and a panel controlling board configured to control the operation unit are disposed above the discharge tray, and the antenna is disposed on the panel controlling board.

In the image forming apparatus, the discharge tray comprises an auxiliary tray configured to extend from the discharge tray in a discharging direction in which a sheet is discharged from the image forming unit, and the terminal receive member is located on a surface of the auxiliary tray, wherein the surface is the upper face of the auxiliary tray when the auxiliary tray is extended.

In the image forming apparatus, an indicator identifying a position of the terminal receiving member is disposed on a discharge unit.

According to the aspects of the discloser, an image forming apparatus comprises a housing, an image forming unit, a discharge tray, a terminal receiving member, and an antenna.

The image forming unit disposed in the housing and configured to form an image on a sheet. The discharge tray disposed in the housing and configured to receive the sheet on which an image is formed by the image forming unit. The terminal receiving member disposed in and coupled to the housing and configured to receive a communication terminal thereon and disposed at a position spaced away from and overlapping the discharge tray. The antenna configured to communicate with the communication terminal received on the terminal receiving member by short-range wireless communication.

Further, while the ink jet printer 1 in the fifth illustrative embodiment described above is a recording apparatus of the ink jet type, the recording method is not limited to the ink jet type but may be that of a laser type, an LED (Light Emitting Diode) type or the like. Where the recording method is that of the ink jet type, an ink jet method of a line type may be applied.

The present disclosure includes any invention which is consistent with the spirit and scope of the disclosure and is not restricted to the illustrative embodiments described hereinabove but the components of the illustrative embodiments may be used in suitable combinations.

What is claimed is:

1. An image forming apparatus comprising:
   an image forming portion;
   a first housing accommodating the image forming portion and having a feed tray configured to accommodate a sheet on which an image is to be formed by the image forming portion, and a discharge tray at an upper portion of the first housing, the discharge tray being configured to receive the sheet having the image formed by the image forming portion discharged from a discharge port;
   an antenna device disposed in the first housing and for establishing a near field communication;
   a communication unit which corresponds to the antenna device and is disposed on an upper surface of the first housing;
   a reading portion configured to read an image of an original; and
   a second housing accommodating the reading portion and positioned at a location spaced above the first housing,
   wherein the communication unit is positioned outside the discharge tray both of in a discharging direction of discharging the sheet and in a width direction perpendicular to the discharging direction, and
   wherein when the second housing and the communication unit are projected to a horizontal plane, the communication unit projected to the horizontal plane is displaced with respect to the second housing projected to the horizontal plane.

2. The image forming apparatus according to claim 1, further comprising an operating portion for operating the image forming apparatus,
   wherein the communication unit is positioned at a different position than the operating portion in the width direction.

3. The image forming apparatus according to claim 1,
   wherein the communication unit is positioned at a different position than the second housing in the discharging direction.

4. The image forming apparatus according to claim 1,
   wherein the image forming portion has a charger projected to a horizontal plane, and
   wherein the antenna device is projected to the horizontal plane and displaced with respect to the charger projected to the horizontal plane.

5. The image forming apparatus according to claim 1, wherein the image forming portion has a fixing unit, which is positioned closer to a back face of the first housing than a front face of the first housing.

6. The image forming apparatus according to claim 1, wherein the first housing includes a top cover, the antenna device being disposed below the top cover.

7. The image forming apparatus according to claim 1, further comprising:
   a joining member located between the first housing and the second housing,
   wherein the communication unit is positioned at a different position than the joining member in the discharging direction.

8. The image forming apparatus according to claim 7, wherein the joining member is positioned outside the discharge tray in the width direction, and
   wherein the communication unit is positioned at the same position as the joining member in the width direction.

* * * * *